(12) United States Patent
Sawyer et al.

(10) Patent No.: US 11,691,681 B2
(45) Date of Patent: Jul. 4, 2023

(54) VEHICLE WITH DEPLOYABLE TOWING WHEELS

(71) Applicant: Howe & Howe Inc., Waterboro, ME (US)

(72) Inventors: Zachary E. Sawyer, Alfred, ME (US); Michael Howe, Biddeford, ME (US); Cote Taylor, Canton, MI (US)

(73) Assignee: Howe & Howe Inc., Waterboro, ME (US)

( * ) Notice: Subject to any disclaimer, the term of this patent is extended or adjusted under 35 U.S.C. 154(b) by 0 days.

(21) Appl. No.: 17/859,488

(22) Filed: Jul. 7, 2022

(65) Prior Publication Data

US 2022/0340216 A1 Oct. 27, 2022

Related U.S. Application Data

(62) Division of application No. 16/534,061, filed on Aug. 7, 2019, now Pat. No. 11,407,458.

(60) Provisional application No. 62/855,511, filed on May 31, 2019.

(51) Int. Cl.
*B62D 55/02* (2006.01)
*B60D 1/48* (2006.01)
*B60D 1/00* (2006.01)

(52) U.S. Cl.
CPC ............. *B62D 55/02* (2013.01); *B60D 1/488* (2013.01); *B60D 2001/001* (2013.01)

(58) Field of Classification Search
CPC ................................ B62D 55/02; B62D 55/04
See application file for complete search history.

(56) References Cited

U.S. PATENT DOCUMENTS

| | | | | |
|---|---|---|---|---|
| 1,509,030 A | * | 9/1924 | Roy ....................... | B62D 55/02 180/6.7 |
| 2,161,760 A | * | 6/1939 | Hackel .................. | B62D 55/02 305/141 |
| 4,374,592 A | | 2/1983 | Geary et al. | |
| 4,747,457 A | * | 5/1988 | Buscaiolo ............ | B62D 51/007 180/19.1 |
| 5,615,748 A | * | 4/1997 | Lansberry ................ | B62D 9/00 180/9.42 |
| 6,220,377 B1 | * | 4/2001 | Lansberry .............. | B62D 55/02 180/6.48 |
| 7,316,405 B2 | * | 1/2008 | Kritman ................. | A61G 5/061 180/326 |
| 7,475,745 B1 | * | 1/2009 | DeRoos ................. | B62D 55/02 180/8.1 |
| 9,637,186 B1 | * | 5/2017 | Goldenberg ........... | B62D 55/02 |
| 10,696,316 B1 | * | 6/2020 | Parks ........................ | B62B 9/02 |

(Continued)

FOREIGN PATENT DOCUMENTS

CN 107264655 10/2017
DE 202013105667 1/2015

(Continued)

*Primary Examiner* — Kevin Hurley
(74) *Attorney, Agent, or Firm* — BainwoodHuang

(57) ABSTRACT

Example apparatuses and techniques are disclosed for towing tracked vehicles at high speeds without various deficiencies and for allowing a vehicle to be configured to extend supplemental wheels from a storage configuration into a ground support configuration in which the vehicle is able to make use of the supplemental wheels for additional ground support.

12 Claims, 18 Drawing Sheets

(56) References Cited

U.S. PATENT DOCUMENTS

2004/0011574 A1  1/2004  Borgwarth et al.
2020/0377162 A1* 12/2020 Howe ................... B60G 11/22
2021/0024147 A1*  1/2021 Brazier ................ B62D 55/12

FOREIGN PATENT DOCUMENTS

DE   202013105667 U1 *  1/2015  ............ B62D 55/04
WO       1995/27646     10/1995
WO       1999/54554     10/1999
WO       2013/054012     4/2013

* cited by examiner

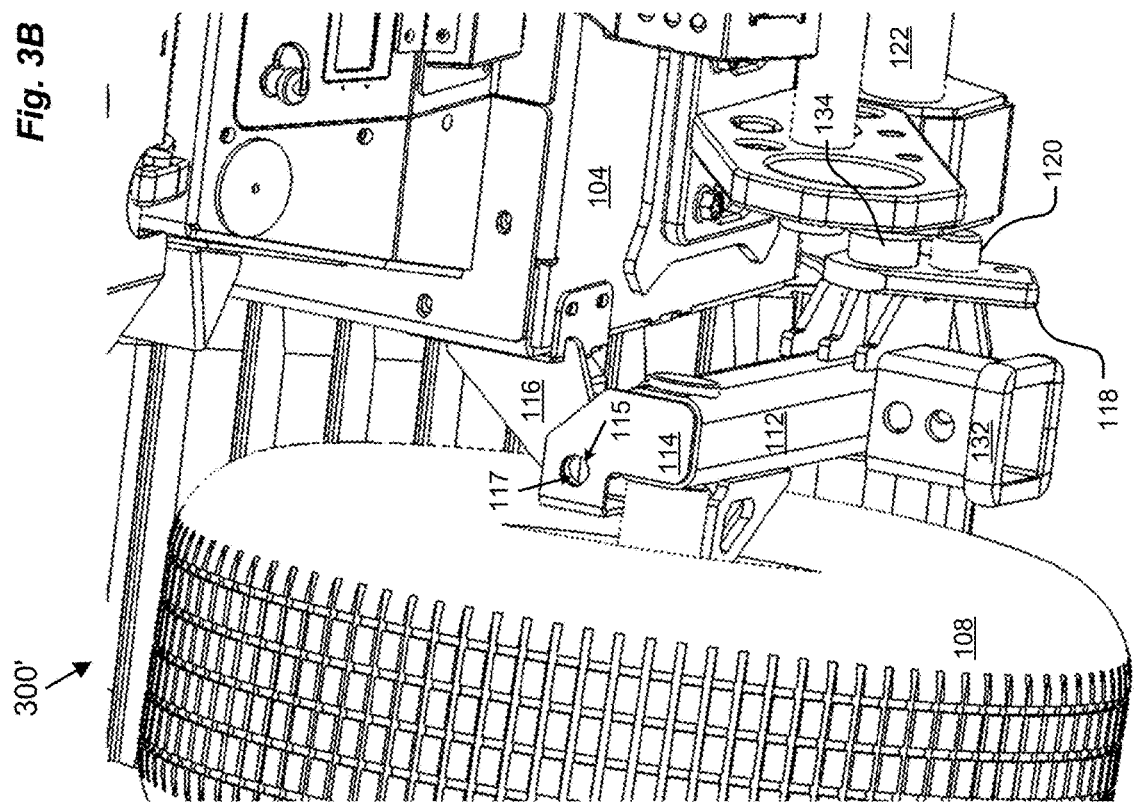
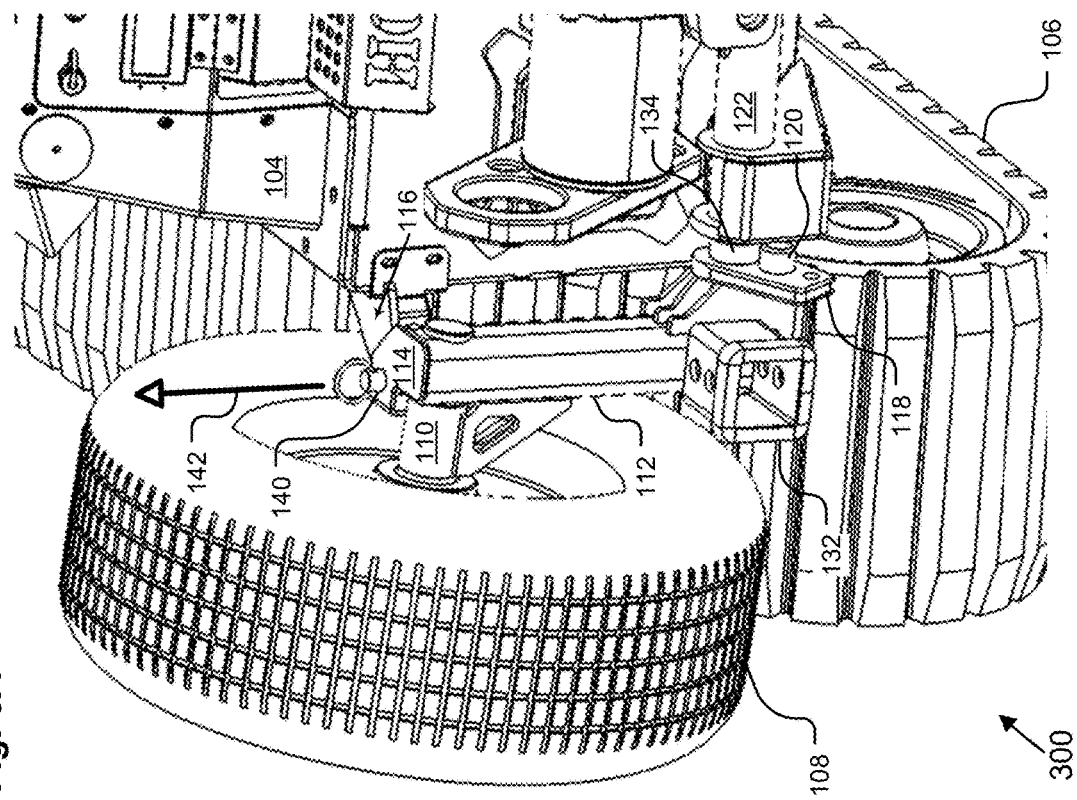

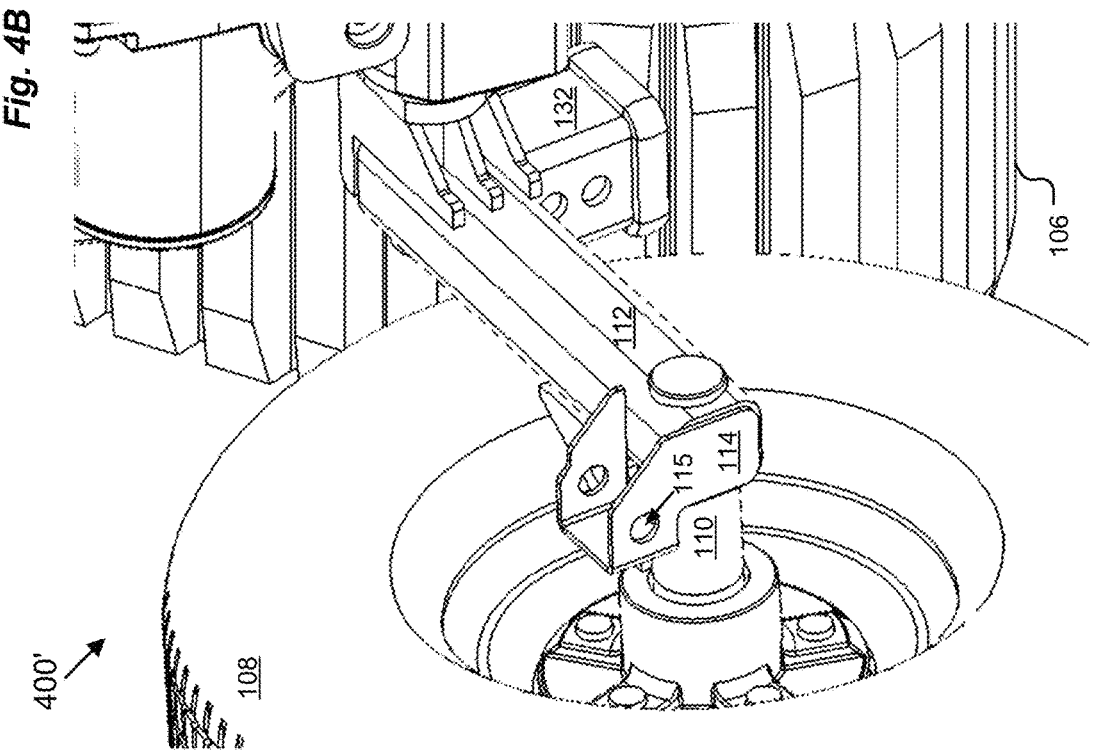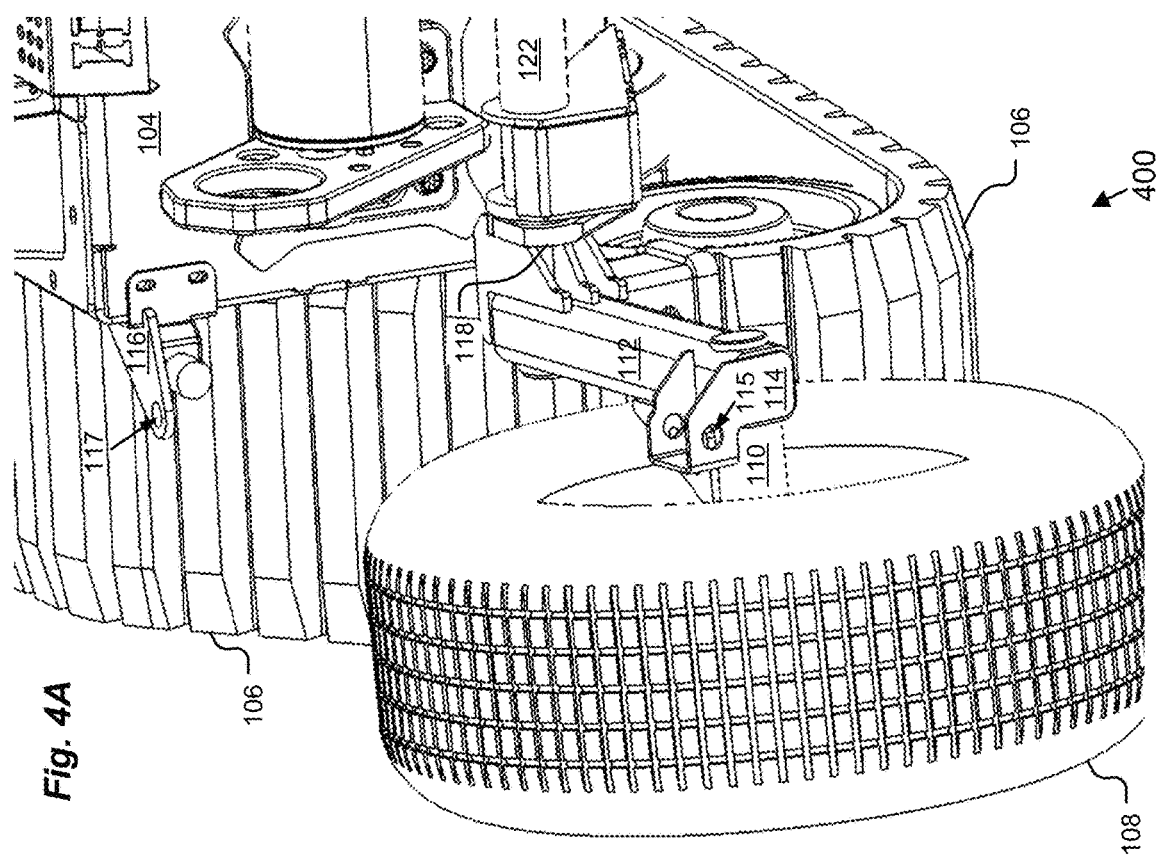

VEHICLE WITH DEPLOYABLE TOWING WHEELS

RELATED APPLICATION

This Application is a divisional of U.S. patent application Ser. No. 16/534,061, filed Aug. 7, 2019, which claims priority to U.S. Provisional Application No. 62/855,511, filed on May 31, 2019. The entire contents and teachings of both prior applications are incorporated herein by this reference.

BACKGROUND

Conventional tracked vehicles provide an excellent option for travel over uneven or unstable terrain. These vehicles operate a drivetrain that drives one or more tracks that provide large contact with the ground. Thus, even if the ground is slippery or uneven, traction is still available, and the vehicle is able to move. Long tracks allow for increased ground contact between the track and the ground. When the ground is uneven, the vehicle is able to maintain traction under such circumstances.

SUMMARY

Embodiments are directed to vehicles, including tracked vehicles, with one or more supplemental wheels that may be used for towing and/or for providing extra ground support (e.g., extending the effective track length).

Conventional tracked vehicles are effective for travel over uneven or unstable terrain. It is rare, however, for a tracked vehicle to operate at high speeds, e.g., above 40 kilometers per hour. Even when high-speed operation is possible, sustained travel at such speeds can damage the tracks and mechanical structures that support them as well as the roads on which the vehicles are driven. It is not unusual, therefore, for a tracked vehicle to be towed when it is necessary to transport it over long distances or at high speeds.

Due to these problems, towing a tracked vehicle generally requires a flat-bed trailer. For example, a trailer can be tilted so that one end contacts the ground. The vehicle can then be driven onto the trailer and secured in place. Typically, getting the vehicle properly placed on the flat-bed trailer is at least a two-person job, and it is not without risk to personnel. It also requires that the trailer be made available. The trailer may itself be a large, heavy object, which can be costly to transport to the required site and costly to return after the vehicle has been moved. Thus, a more convenient solution for transporting a tracked vehicle is needed.

This need may be addressed by providing a tracked vehicle with towing wheels that may be deployed in both a first position, in which the vehicle can be driven on its tracks, and a second position, in which the vehicle can be towed on the towing wheels.

In one embodiment, an apparatus is provided. The apparatus includes a tracked vehicle having a weight, the tracked vehicle including a vehicle body and a track. The apparatus further includes a wheel assembly coupled to the vehicle body and configured to provide movement of a wheel between a first position and a second position. No portion of the wheel extends below a lowest extent of the track with the wheel disposed in the first position. At least a portion of the wheel extends below the lowest extent of the track with the wheel disposed in the second position, such that at least part of the weight of the tracked vehicle is borne by the wheel.

In one embodiment, a method of towing a tracked vehicle having a track is provided. The method includes swinging a wheel assembly coupled to the tracked vehicle about a first axis substantially parallel to but offset from a second axis of rotation of a wheel of the wheel assembly until the wheel reaches a towing position in which a bottom portion of the wheel extends below a lowest extent of the track such that at least part of the weight of the vehicle is borne by the wheel; locking the wheel assembly into the towing position to prevent further swinging; and towing the tracked vehicle supported on the wheel rather than the track.

In one embodiment, a wheel assembly apparatus is provided. The wheel assembly apparatus includes a wheel; an axle about which the wheel spins; an arm mounted substantially perpendicularly to the axle at a proximal end of the arm; and a shaft mounted substantially parallel to the axle at a distal end of the arm. The shaft is operative to couple the wheel assembly to a tracked vehicle at a mounting point. The wheel assembly further includes a lever receiver mounted at the distal end of the arm. The lever receiver is configured to receive a lever operative to rotate the arm around the shaft such that the wheel swings into a towing position in which a bottom portion of the wheel extends below a lowest extent of a track of the tracked vehicle such that at least part of the weight of the tracked vehicle is borne by the wheel.

Advantageously, a tracked vehicle can be towed without needing a trailer, and arranging the vehicle in the towing configuration can generally be accomplished by a single operator.

It should be understood that although embodiments are described in connection with tracked vehicles, other embodiments may include implementation with non-tracked vehicles, such as wheeled vehicles.

BRIEF DESCRIPTION OF THE SEVERAL VIEWS OF THE DRAWINGS

Features and advantages will be apparent from the following description of particular embodiments of the invention, as illustrated in the accompanying drawings, in which like reference characters refer to the same or similar parts throughout the different views.

FIGS. 3A-3B depict other views of an example tracked vehicle with its rear wheel in the storage configuration for use in connection with various embodiments.

FIGS. 4A-4B depict other views of an example tracked vehicle with its rear wheel in the support configuration for use in connection with various embodiments.

DETAILED DESCRIPTION OF THE INVENTION

Embodiments are directed to vehicles, including tracked vehicles, with one or more supplemental wheels installed that may be used for extra ground support (e.g., extending the effective track length) and/or towing.

In an example, each towing wheel is part of an assembly that includes an axle around which the wheel can be turned and an arm that extends substantially perpendicularly from the axle. The arm has a distal end from which a shaft extends substantially parallel to the axle. Establishing the first position may involve inserting the shaft into a first receptacle, such as a first tube in a body of the vehicle, and orienting the wheel assembly so that the wheel is at or above the lowest part of the tracks. Establishing the second position may involve inserting the shaft into a second receptacle, such as a second tube in the body of the vehicle, and orienting the wheel assembly so that the wheel is below the lowest part of the tracks. Various retainers may be used for holding the wheels in the respective positions.

In some examples, establishing the second position involves inserting the shaft of a wheel assembly into the second receptacle and then rotating the wheel assembly about an axis formed by the second receptacle until the wheel swings below the tracks. In some cases, a bracing bracket is provided to limit rotation of the wheel assembly to an angle slightly past vertical, such that normal forces of gravity hold the wheel assembly in place with the weight of the vehicle (on the affected side) resting on the wheel and the tracks elevated above the ground. Rotation may be accomplished using a lever that inserts into a leverage receiver in the wheel assembly. Rotating the wheel assembly using the lever has the effect of jacking up the vehicle onto the wheel. Once rotation passes vertical and the limit imposed by the bracing bracket is reached, no additional force is needed to hold the wheel in the second position, and an operator can secure the wheel in place using retainers. The same process may be repeated on the other side of the vehicle.

In some examples, the first position is variable and the wheel assembly can be rotated about an axis formed by the first receptacle to establish multiple angles. In an example, one such angle places the wheel in a storage location above the level of the tracks and another such angle places the wheel in an extended location at substantially the same level as the tracks (i.e., no more than 10 inches above the lowest level of the tracks, which are typically resting on the ground). In the extended location, the wheel performs an additional role of extending the effective track length of the vehicle, increasing stability and helping to prevent the vehicle from flipping over during steep climbs or descents.

Figure 1:
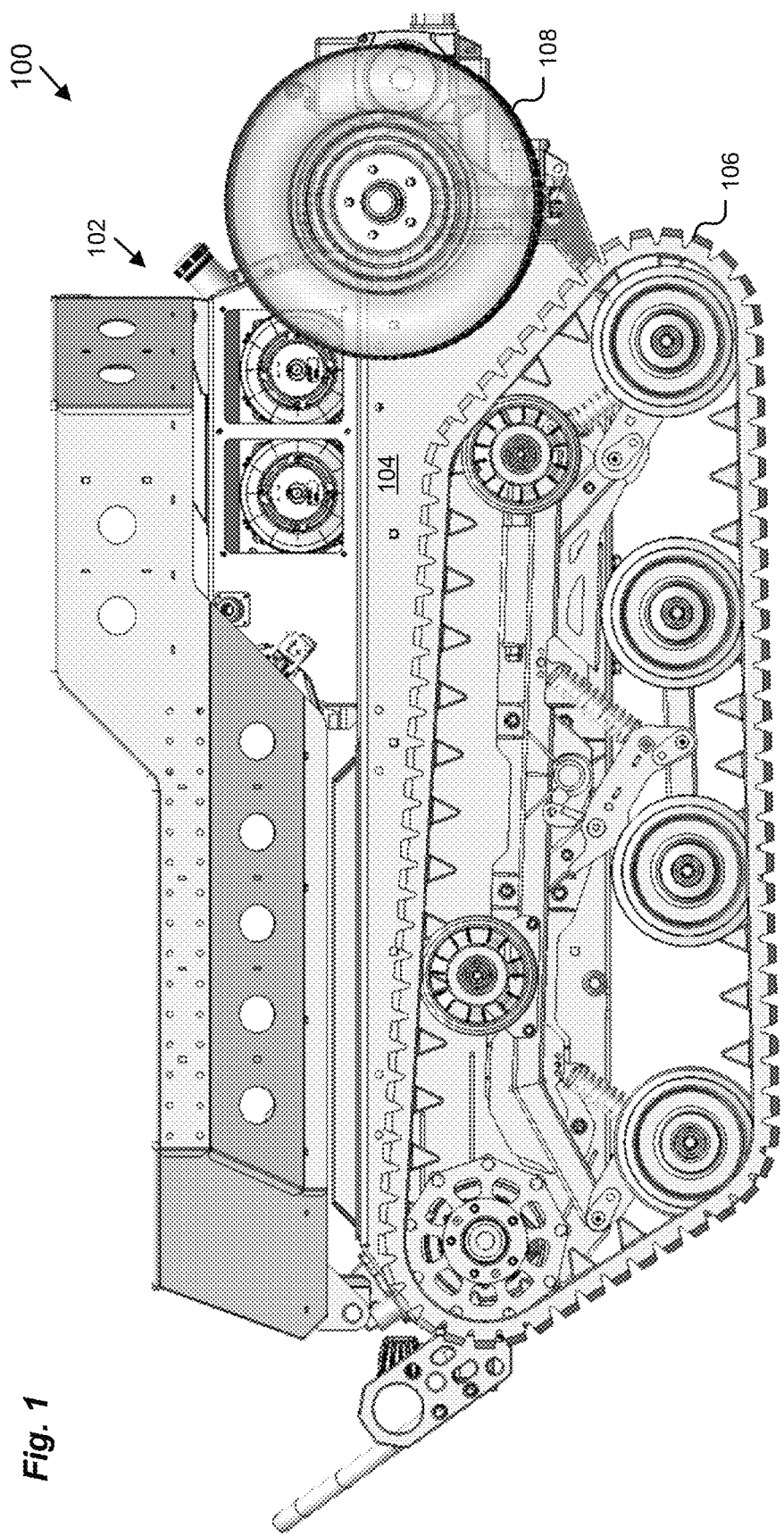
FIG. 1 depicts a view of an example tracked vehicle with a rear wheel in a storage configuration for use in connection with various embodiments.

FIG. 1 depicts a view 100 of an example tracked vehicle 102. An example tracked vehicle may be an equipment carrier used to accompany soldiers through the field.

Vehicle 102 includes a vehicle body 104 as well as a drive track 106 configured to propel the vehicle 106 across the ground as is well-known in the art. In addition, vehicle 102 includes one or more (for example, two) supplemental wheels 108. As depicted in view 100, the supplemental wheels (hereinafter "wheels") 108 are in a raised storage configuration in the rear of the vehicle 102 that allows the wheels 108 to be out of the way while under normal operation.

Figure 2:
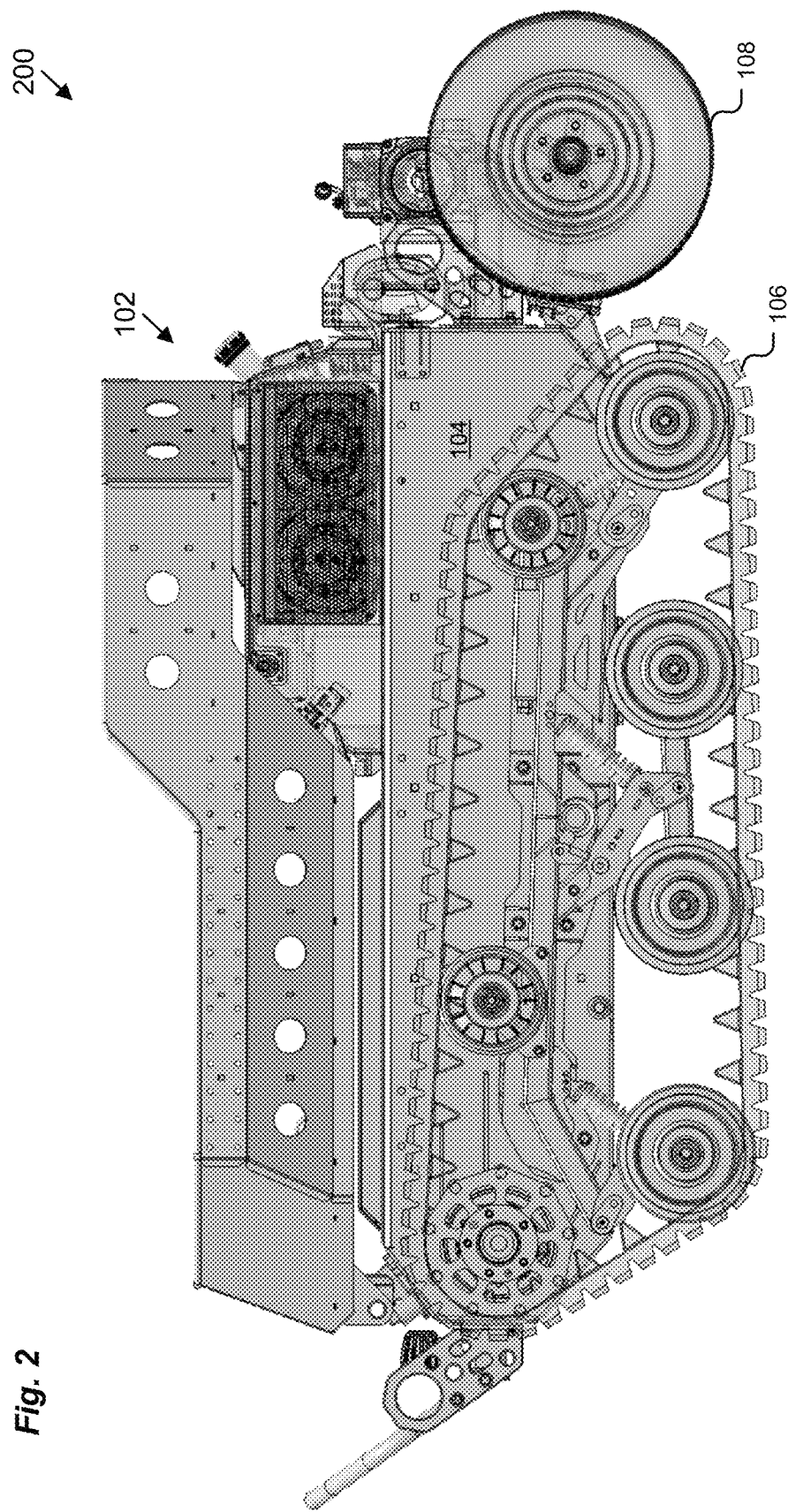
FIG. 2 depicts a view of an example tracked vehicle with a rear wheel in a support configuration for use in connection with various embodiments.

FIG. 2 depicts another view 200 of the example tracked vehicle 102 with the wheels 108 in a lowered ground support configuration at the rear of the vehicle 102.

FIGS. 3A-3B depict additional views 300, 300', respectively, of a rear corner of the vehicle 102 while in the storage configuration.

Wheel 108 is mounted on an axle 110 that allows it to freely rotate around the axis of the axle 110. Axle 110 is mounted on an arm 112 that is mounted to the vehicle body 104 at both ends. Axle 110 is mounted substantially perpendicular to the arm 112. The term "substantially" perpendicular means within 10 degrees of perpendicular. A mounting bracket 114 is mounted at one end of the arm 112 adjacent to the axle 110. This mounting bracket 114 may be affixed to another mounting bracket 116 mounted on the vehicle body 104. For example, a retaining pin 140 may be placed through a hole 115 on mounting bracket 114 and another hole 117 on mounting bracket 116. Retaining pin 140 may be removed from holes 115, 117 by sliding it upwards in direction 142. Various types of retaining pins 140 may be used, such as, for example, a hitch pin. In some embodiments, other affixation mechanism may be used instead of a retaining pin 140.

A bracing bracket 118 is mounted at the opposite end of the arm 112 away from the axle 110. This bracing bracket 118 may also be affixed to the vehicle body 104. As depicted, a shaft 134 protrudes (see FIG. 8 for a clearer depiction) substantially perpendicular to the arm 112 and substantially parallel to the axle 110 (but offset from the axle 110 by about the length of the arm 112) at the bracing bracket 118 into a tube 122 mounted on the body 104. The term "substantially" parallel means within 10 degrees of parallel. A peg 120 also protrudes from the bracing bracket 118 substantially parallel to the shaft 134 and fits into one or more depressions 128, 130 (see FIG. 5) in the body 104 to keep the arm 112 in place. Thus, through mounting on both ends of the arm 112, the wheel 108 is affixed solidly to the vehicle body 104.

Figure 7:
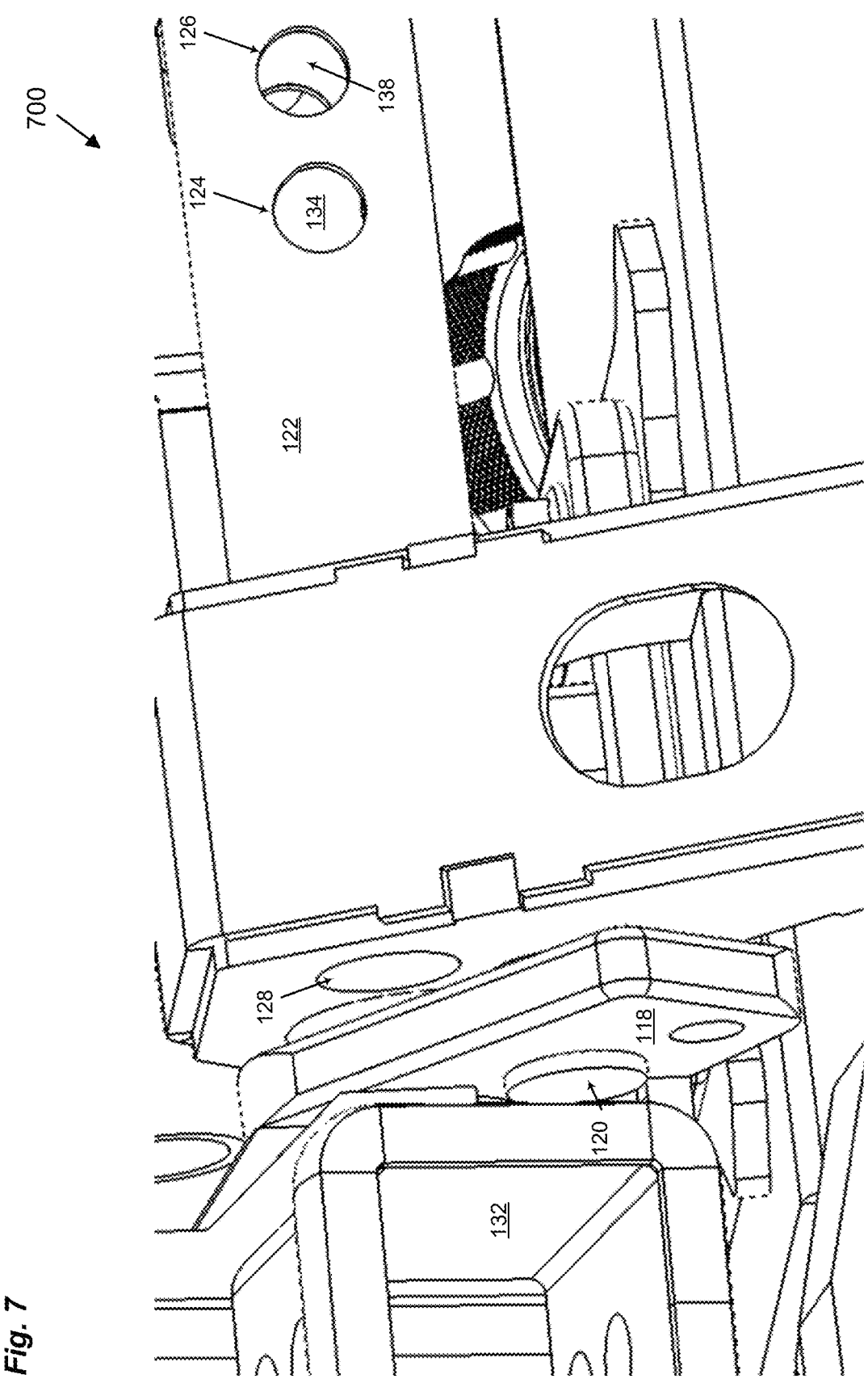
FIG. 7 depicts another view of an example tracked vehicle with its rear wheel in the support configuration for use in connection with various embodiments.

FIGS. 4A-4B depict additional views 400, 400', respectively, of the same rear corner of the vehicle 102 while in an extended ground support configuration. Wheel 108 has been tilted backwards by separating brackets 114, 116 and rotating arm 112 around the shaft 134 towards the rear of the vehicle 102. As can be seen in view 700 of FIG. 7, a hole 138 through shaft 134 has become exposed through hole 126 in tube 122, while nearby hole 124 of tube 122 reveals the shaft 134 underneath. In view 700 of FIG. 7, peg 120 has been inserted into depression 130 (not visible in FIG. 7). A retaining pin (e.g., retaining pin 140) can then be inserted through holes 126, 138 to prevent the shaft 134 from sliding within tube 122, locking the wheel 108 into place in the ground support configuration.

Figure 6:
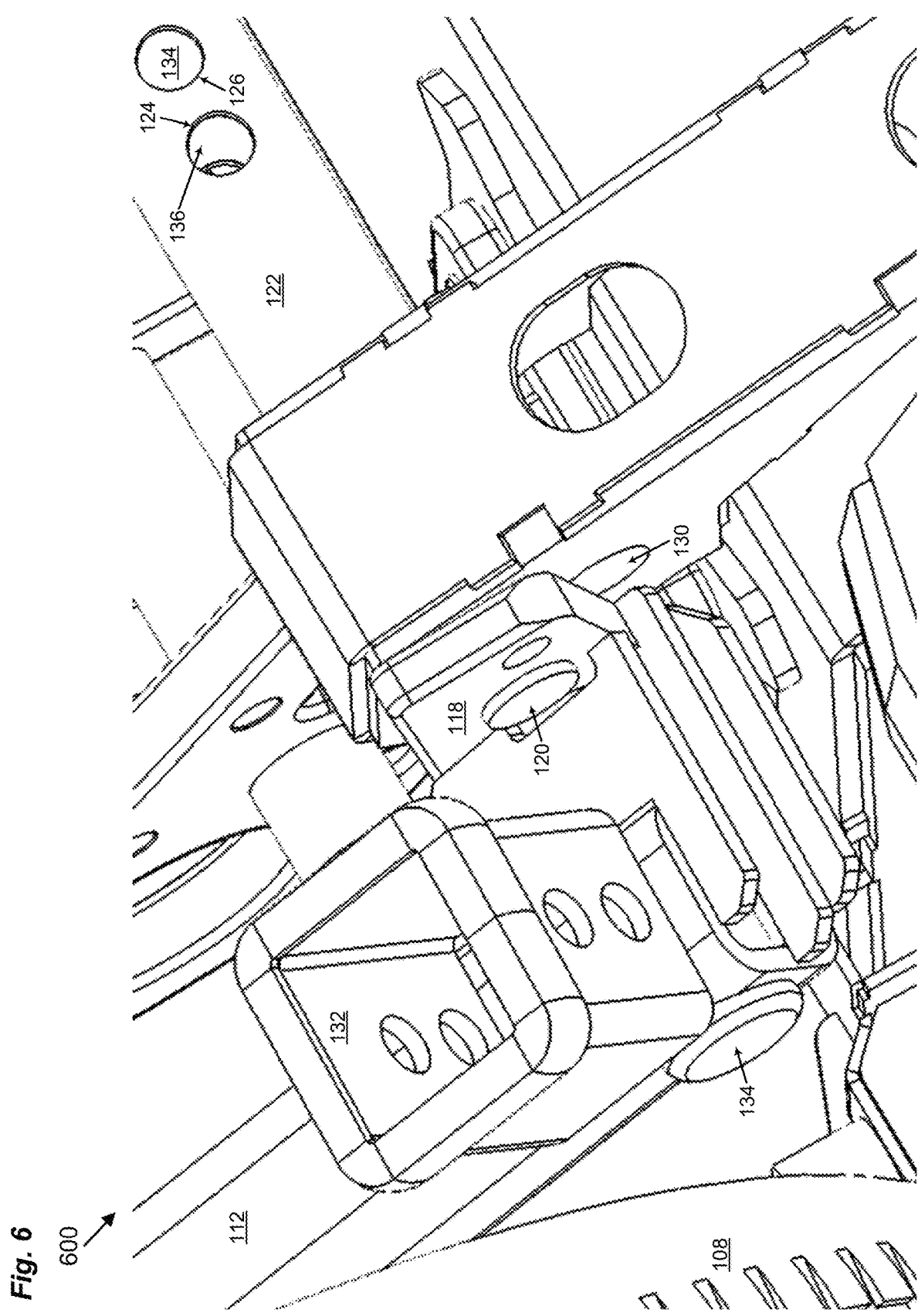
FIG. 6 depicts another view of an example tracked vehicle with its rear wheel in the storage configuration for use in connection with various embodiments.

FIG. 6 depicts a view 600, which is similar to view 700 except that the wheel 108 has not been rotated into the ground support configuration, but rather remains in the storage configuration of FIGS. 1, 3A, and 3B. In view 600, peg 120 has been inserted into depression 128 (not visible in FIG. 7) rather than depression 130. In addition, another hole 136 through shaft 134 has become exposed through hole 124 in tube 122, while hole 126 of tube 122 reveals the shaft 134 underneath. In some embodiments, a retaining pin (e.g., similar to retaining pin 140) may be inserted through holes 126, 136 to prevent the shaft 134 from sliding within tube 122, locking the wheel 108 into place in the storage configuration. In other embodiments, no retaining pin is used through shaft 134 and tube 122 when in the storage configuration. In these embodiments, after removal of the retaining pin 140 from holes 115, 117 and rotation of the arm 112 to tilt the wheel 108 into the ground support configuration, retaining pin 140 may be inserted into holes 126, 138.

Figure 8:
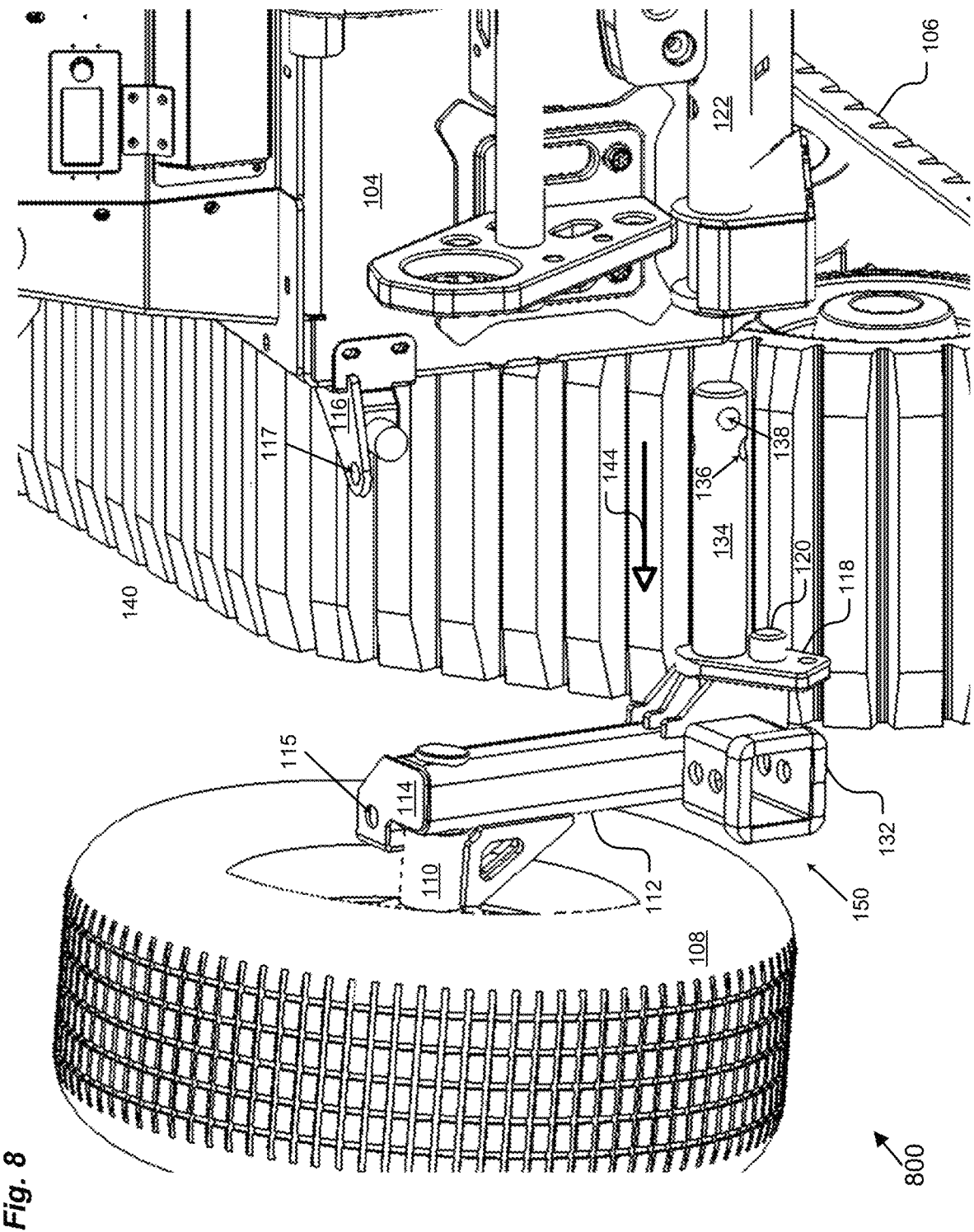
FIG. 8 depicts a view of an example tracked vehicle while a wheel assembly initially in a storage configuration is being removed therefrom.

FIG. 8 illustrates the removal of a wheel assembly 150 from the storage configuration according to various embodiments. Wheel assembly 150 includes wheel 108, axle 110, mounting bracket 114 (and its hole 115), arm 112, bracing bracket 118, and peg 120. Wheel assembly 150 also includes a leverage receiver 132, mounted substantially perpendicular to both the arm 112 and the axle 110, adjacent to the bracing bracket 118. Wheel assembly 150 may also include various other components, not (yet) described. In view 800, retaining pin 140 has been removed from holes 115, 117 by sliding it upwards in direction 142 (see FIG. 3A), and wheel assembly 150 has been pulled away from body 104 by sliding in direction 144. If the wheel assembly 150 is to be rotated so that the wheel 108 is in the ground support configuration, then wheel assembly 150 is typically not slid as far along direction 144 as depicted in FIG. 8. Rather, after retaining pins have been removed, it is typically slid along direction 144 just enough for the peg 120 to clear depression 128. After that is done, the wheel assembly 150 is free to rotate back to the ground support configuration. Then wheel assembly 150 may be slid opposite direction 144 to place peg 120 into depression 130, bracing it into place until the retaining pin 140 is inserted through holes 126, 138, locking the wheel assembly 150 into the ground support configuration.

It should be understood that although only two depressions 128, 130 have been depicted (associated with the storage configuration and the ground support configuration, respectively) and only two holes 124, 126 in tube 122 have been depicted (associated with holes 136, 138, in shaft 134 respectively), additional depressions and holes may also be used to enable additional configurations. Thus, for example, if an additional depression were placed in between depressions 128 and 130 (as well as a corresponding set of holes in shaft 134 and tube 122), then it may be possible to lock the wheel assembly 150 into another configuration in between the storage configuration and the ground support configuration. Similarly, if an additional depression were placed past depression 130 (as well as a corresponding set of holes in shaft 134 and tube 122), then it may be possible to lock the wheel assembly 150 into another configuration in which wheel 108 is rotated even further back than in the ground support configuration.

Figure 9:
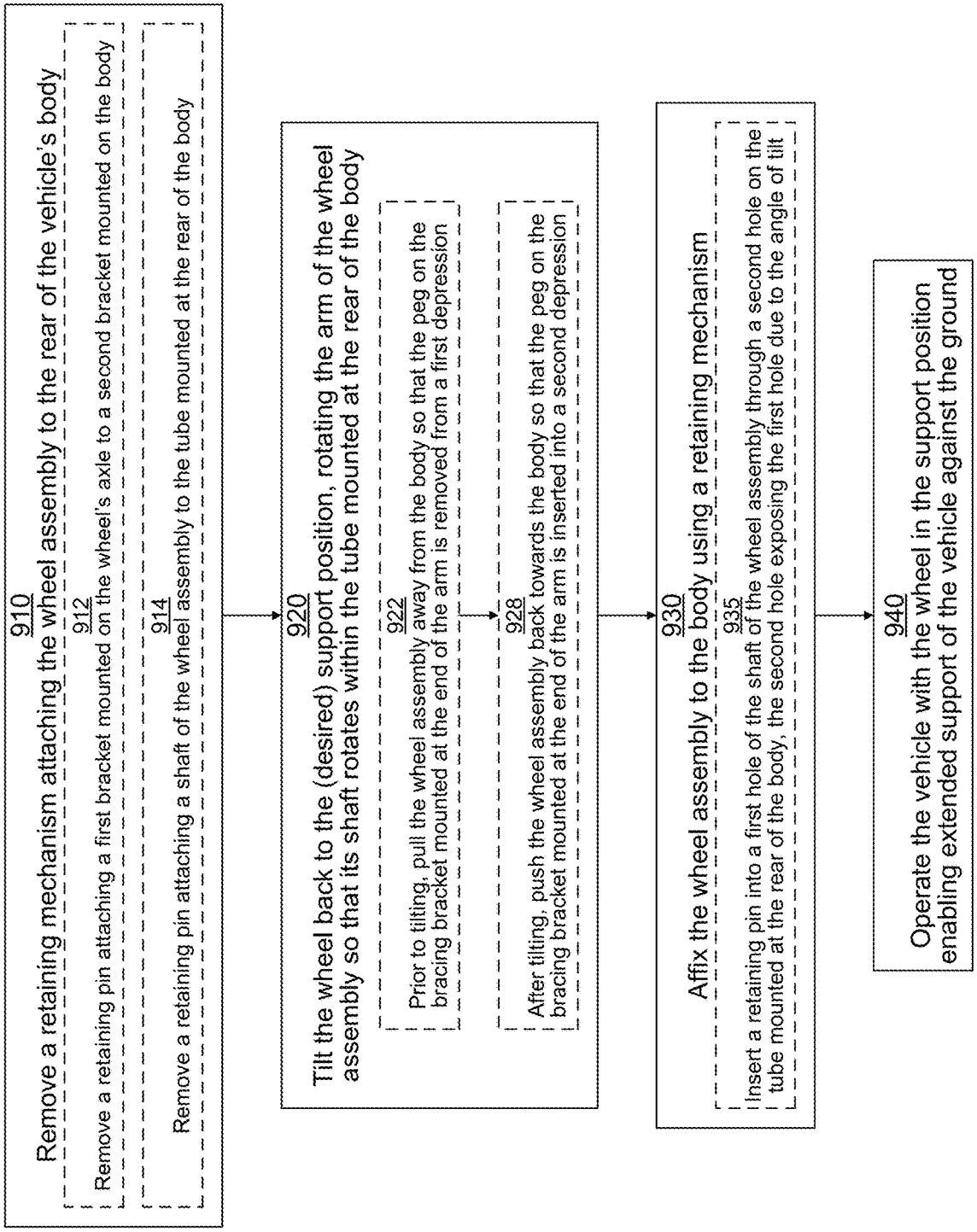
FIG. 9 is a flowchart depicting example methods of reconfiguring a vehicle with a wheel in a storage configuration to instead be in a support configuration.

FIG. 9 illustrates an example method 900 for reconfiguring vehicle 102 from the storage configuration of a wheel 108 (see FIG. 1) to the ground support configuration of that wheel 108 (see FIG. 2). It should be understood that in embodiments in which multiple wheels 108 are used (e.g., one on each side), method 900 may be performed with respect to only one wheel 108 or with respect to more than one of the wheels 108, as desired. It should be understood that one or more of the steps or sub-steps of method 900 may be omitted in some embodiments. Similarly, in some embodiments, one or more steps or sub-steps may be combined together or performed in a different order. Sub-steps marked with dashed lines are optional and/or represent alternative embodiments.

In step 910, an operator removes a retaining mechanism attaching the wheel assembly 150 to the rear of the vehicle body 104. In various embodiments, step 910 may include one or both of sub-steps 912, 914. In other embodiments, another retaining mechanism may be used instead.

In sub-step 912, the operator removes retaining pin 140 attaching a first bracket (e.g., mounting bracket 114) mounted on the axle 110 to a second bracket (e.g., mounting bracket 116) mounted on the body 104, e.g., by sliding retaining pin 140 in direction 142 out of holes 115, 117 (see FIGS. 3A, 3B).

In sub-step 914, the operator removes a retaining pin (not depicted) attaching shaft 134 of the wheel assembly 150 to a tube 122 mounted on the body 104, e.g., by sliding the retaining pin out of holes 124, 136 (see FIG. 6).

Then, in step 920, the operator tilts the wheel 108 back into a desired position (e.g., the ground support configuration) by rotating the arm 112 of the wheel assembly 150 so that its shaft 134 rotates within the tube 122 mounted at the rear of the body 104 (compare FIG. 3A to FIG. 4A). In some embodiments, step 920 may include sub-steps 922 and 928.

Figure 5:
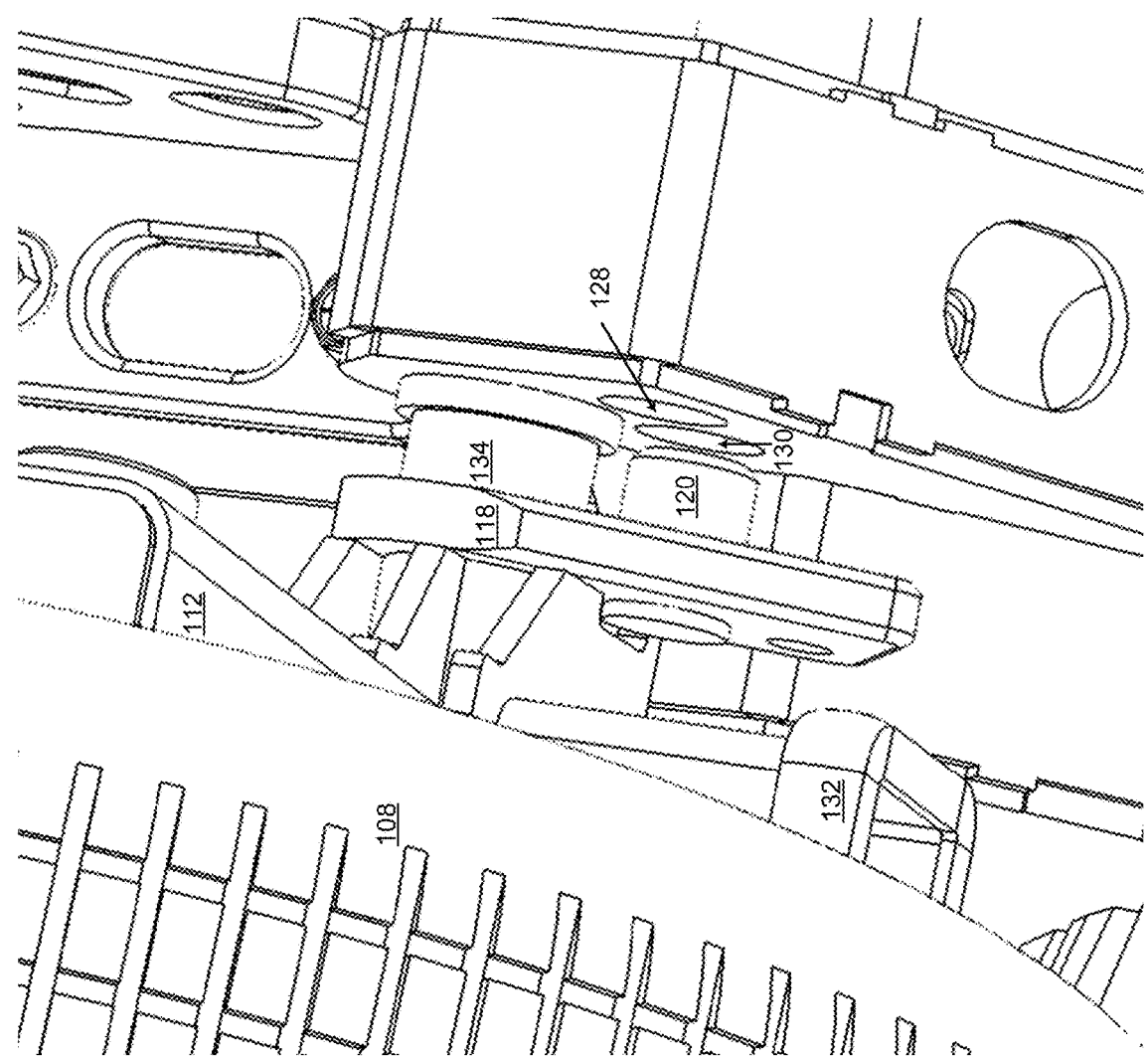
FIG. 5 depicts a view of an example connection between a wheel assembly and a vehicle according to various embodiments.

In sub-step 922, prior to tilting the wheel 108 back, the operator first pulls the wheel assembly 150 away from the body 104 (e.g., in direction 144; see FIG. 8) so that the peg 120 on the bracing bracket 118 is removed from a first depression (e.g., depression 128; see FIGS. 5 and 6). Then, in sub-step 928, after tilting the wheel 108 back, the operator then pushes the wheel assembly 150 back towards the body 104 (e.g., opposite direction 144) so that the peg 120 on the bracing bracket 118 is inserted into a second depression (e.g., depression 130; see FIGS. 5 and 7).

Then, in step 930, the operator affixes the wheel assembly 150 to the body 104 using a retaining mechanism. For example, in some embodiments, step 930 is performed using sub-step 935. In sub-step 935, the operator inserts a retaining pin (e.g., retaining pin 140 that was removed in sub-step 912 or the retaining pin that was removes in sub-step 914) to attach shaft 134 of the wheel assembly 150 to the tube 122, e.g., by sliding the retaining pin into holes 126, 138 (see FIG. 7).

Then, in step 940, the operator may operate the vehicle 102 with the wheel(s) 108 in the ground support configuration, enabling extended support of the vehicle 102 against the ground. In other embodiments, the vehicle 102 is operated with the wheel(s) 108 either further up or further back of the ground support configuration, as desired.

Attention is now drawn to embodiments for towing vehicle 102.

Figure 10:
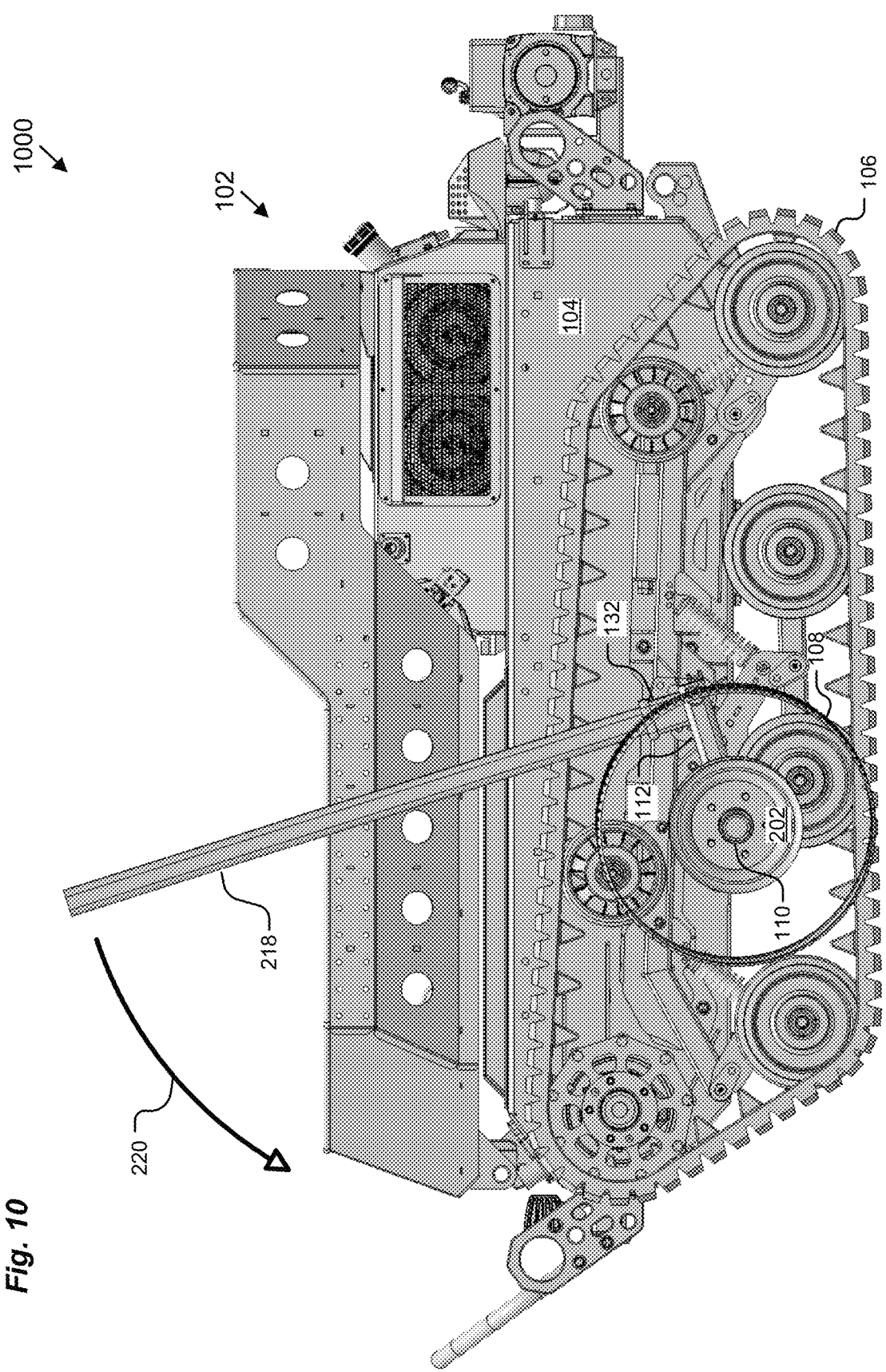
FIG. 10 depicts a view of an example tracked vehicle with a supplemental wheel installed on its side and a lever installed to configure it for use in towing in connection with various embodiments.

FIG. 10 depicts view 1000 respectively, of vehicle 102 in an example intermediate state in the middle of configuration for use in towing in connection with various embodiments.

In some embodiments, wheel assembly 150 may previously have been removed from the rear of the body 104 (see, e.g., FIG. 8) and then slid into a tube 208 (see FIGS. 12A, 12B) mounted in the middle of the body 104. In other embodiments, wheel assembly 150 may have previously been removed from another location on the body 104 or wheel assembly 150 may have not previously been mounted anywhere on the vehicle 102.

As depicted, wheel 108 includes a hub 202 at its center, around axle 110. Wheel assembly 150 may initially be inserted such that the wheel 108 rests on the ground (e.g., at the same level as the bottom of the track 106), or it may be inserted such that wheel 108 is off the ground and then allowed to fall until it hits the ground. In this initial configuration, shaft 134 is inserted into tube 208 with bracing bracket 118 (not visible in FIG. 10; see FIG. 12A) and leverage receiver 132 facing substantially upwards or tilted slightly towards the front of the vehicle 102 (e.g., within 25 degrees forward of straight up), as depicted in FIG. 10. As seen in view 1200 of FIG. 12A, in this initial position, bracing bracket 118 is not engaged with a U-shaped bracket 210 that is mounted on body 104 forward of the tube 208.

Figure 12A:
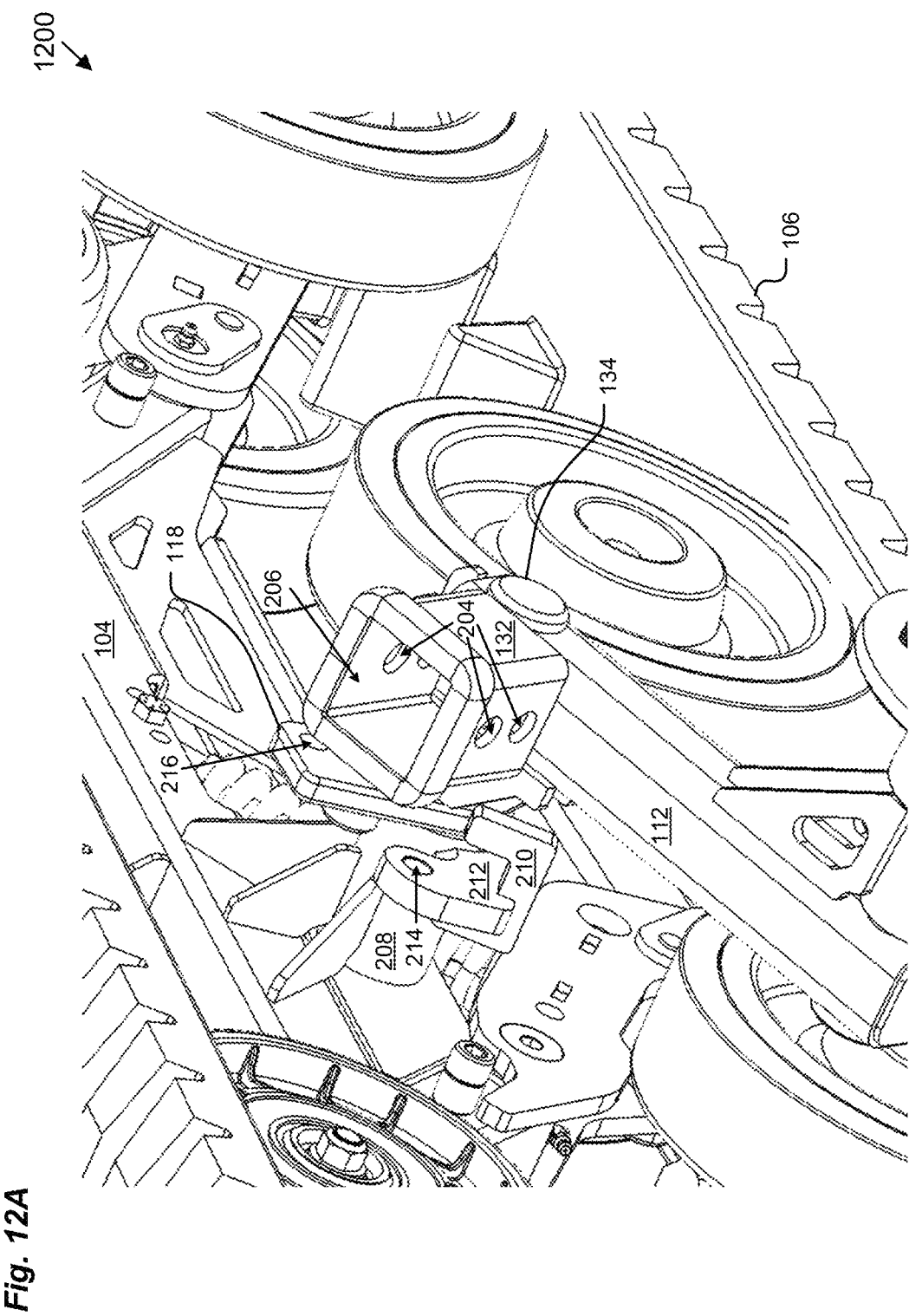
FIGS. 12A-12B depict views of installing a lever on an example tracked vehicle to configure it for use in towing in connection with various embodiments.
Figure 12B:
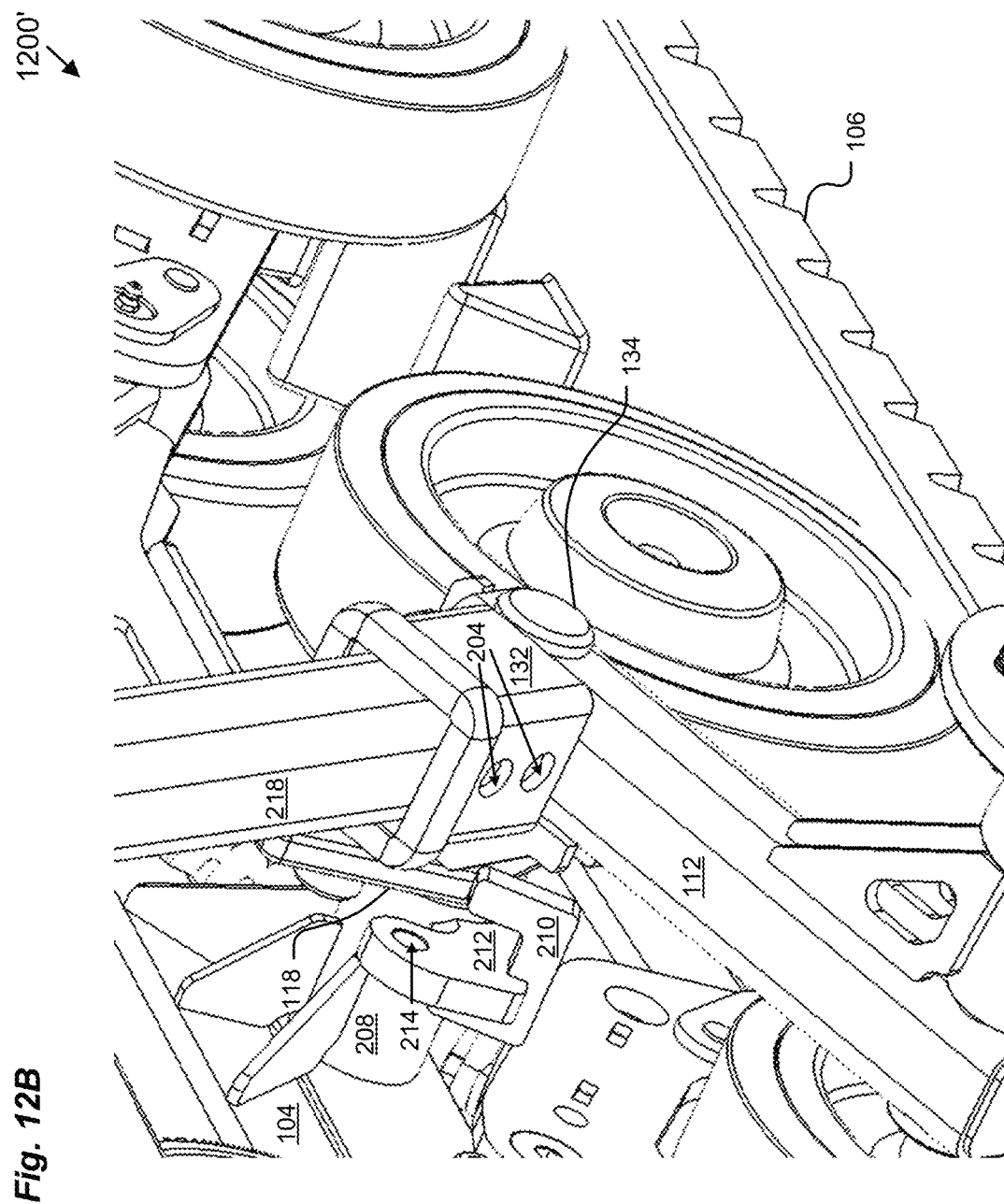
Figure 14:
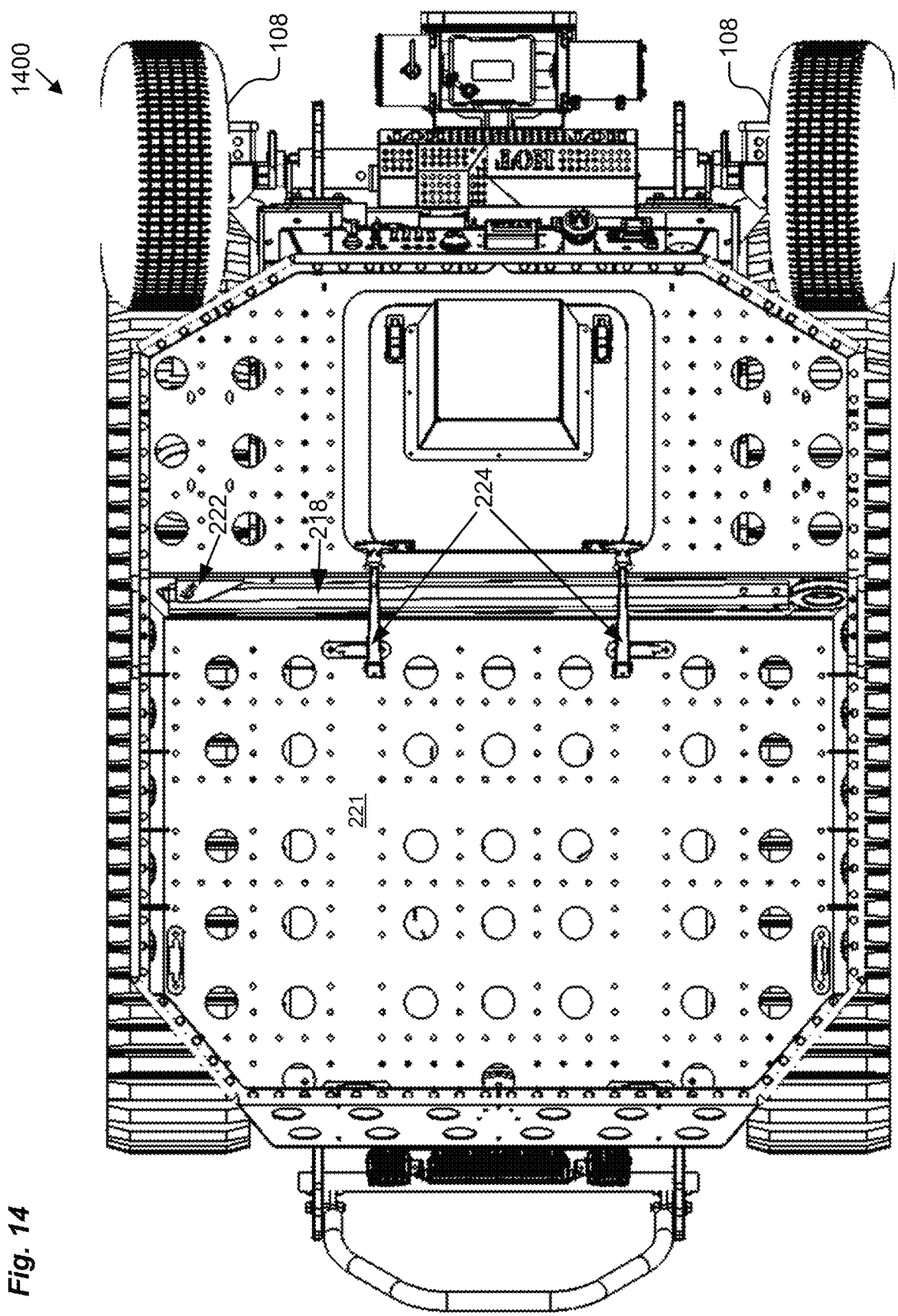
FIG. 14 depicts a view of an example vehicle with a bar for towing and jacking towing wheels in a storage configuration.

It can be seen in view 1200 of FIG. 12A that leverage receiver 132 may include one or more holes 204 that are configured to fit a retaining pin 222 (see FIG. 14). In some embodiments, retaining pin 222 may be similar to retaining pin 140. Leverage receiver 132 also includes a leverage hole 206 configured to receive a lever bar 218 (see view 1200' of FIG. 12B for a depiction of lever bar 218 inserted into leverage hole 206 of leverage receiver 132). FIG. 12B depicts an example view 1200' of lever bar 218 inserted into the leverage receiver 132 while the wheel assembly 150 is still in the intermediate state of FIG. 10. One or more retaining pins 222 may be inserted through one or more of the holes 204 and one or more holes through the lever bar 218 (not depicted) in order to prevent the lever bar 218 from slipping out of leverage hole 206 during leverage operation.

FIG. 10 also illustrates an example process of operating the lever bar 218 to configure an example tracked vehicle 102 for towing in connection with various embodiments. In view 1000 of FIG. 10, operator rotates the lever bar 218 along direction 220 of rotation. This results in lever action causing the vehicle 102 to be jacked up onto wheel 108 and off of track 106 as depicted in view 1100 of FIG. 11. In view 1100, the lever bar 218 has rotated in direction 220 to a new position facing substantially towards the front of vehicle 102 (e.g., within 25 degrees). View 1100 depicts vehicle 102 when it has just about reached a towing configuration (although lever bar 218 should still be removed and the vehicle 102 should still be hitched to the towing vehicle—see below in connection with FIG. 15B).

Figure 13A:
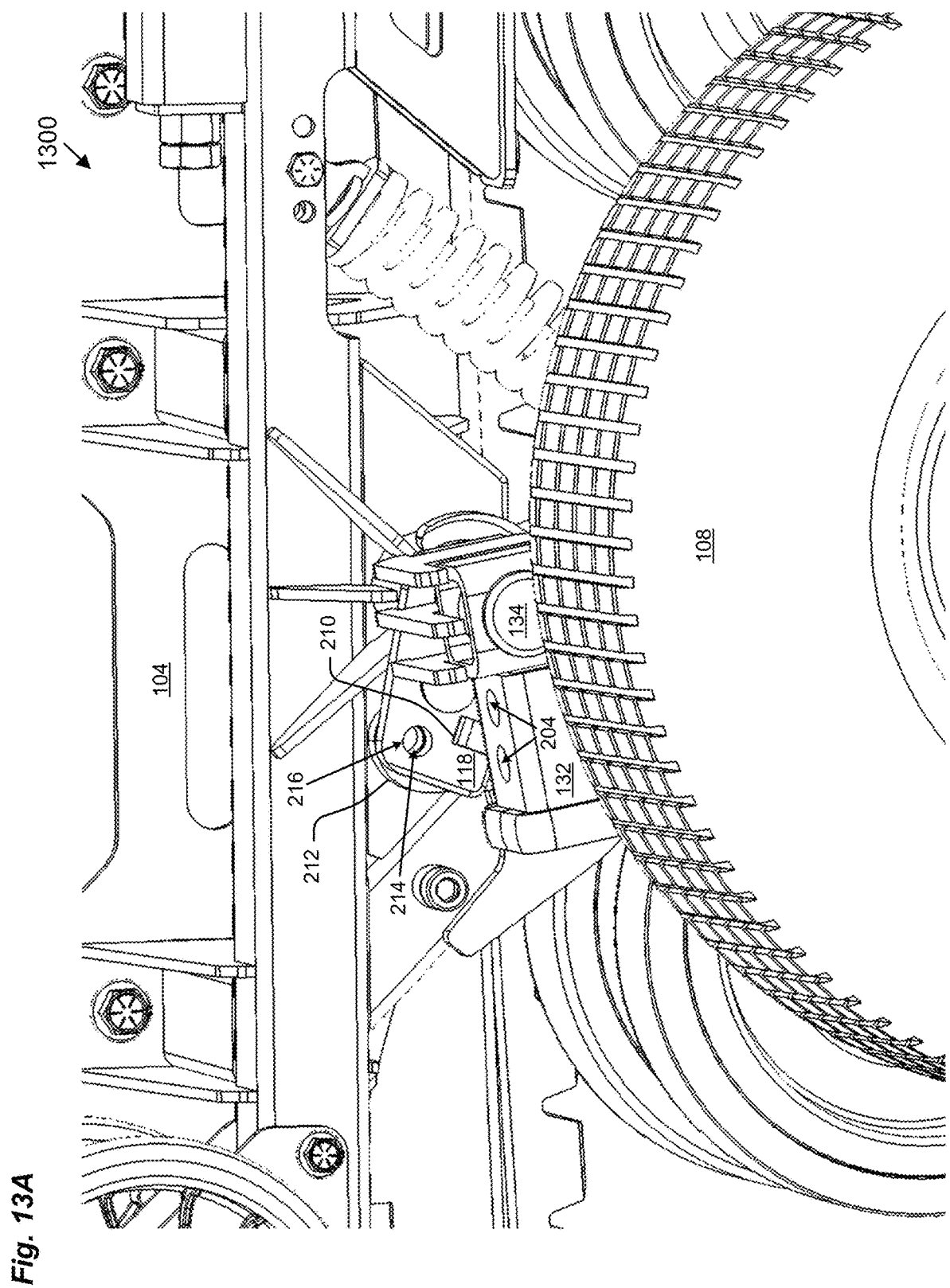
FIGS. 13A-13B depict views of an example tracked vehicle with a supplemental wheel that has been configured for use in towing in connection with various embodiments.
Figure 13B:
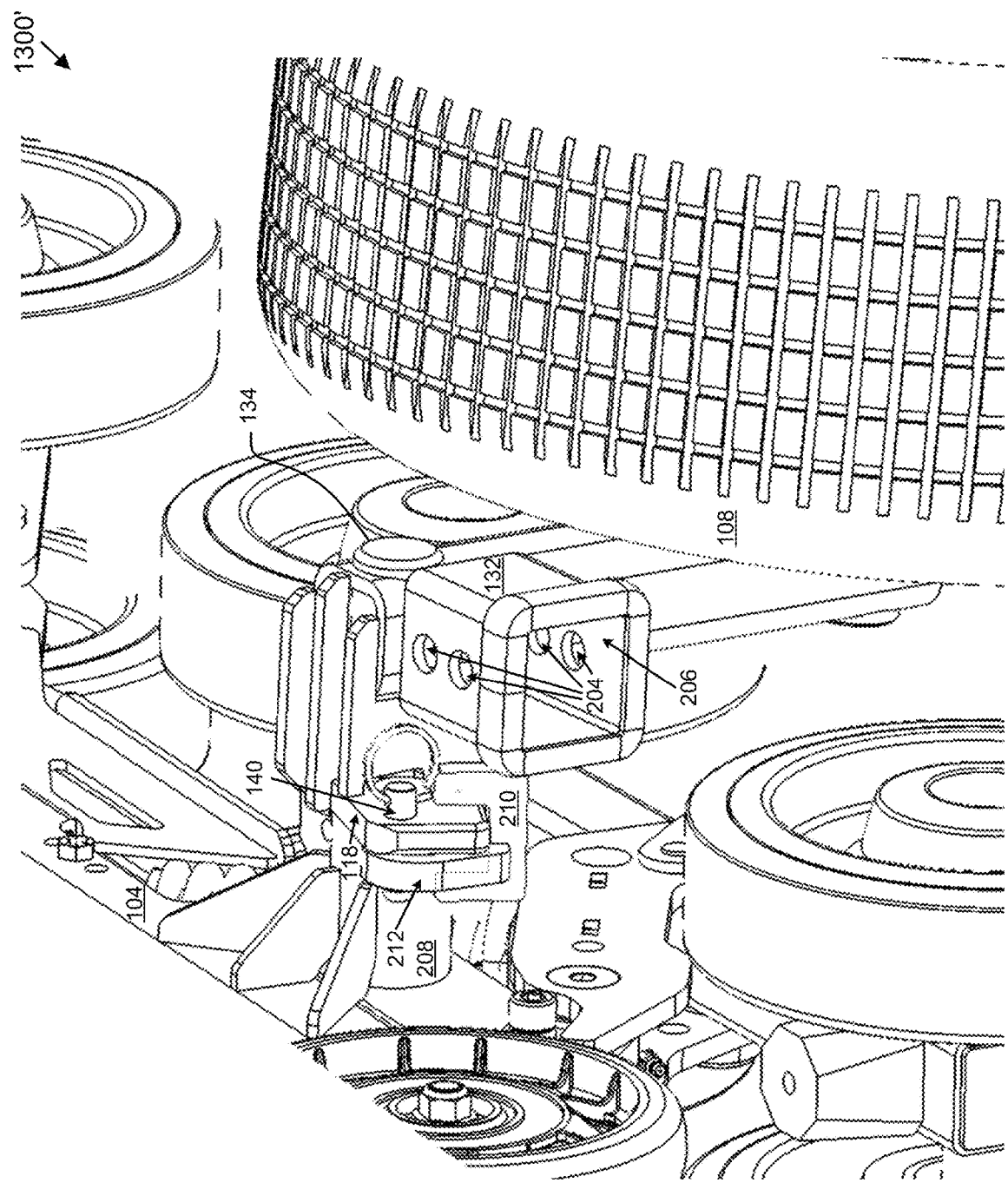

FIGS. 13A, 13B depict views 1300, 1300' respectively, of vehicle 102 in an example towing configuration (e.g., after view 1100) for use in towing in connection with various embodiments. In this configuration, bracing bracket 118 has moved forward until it has been fully inserted into U-shaped bracket 210. In this configuration, a hole 216 on bracing bracket 118 is lined up with another hole 214 on a mounting bracket 212 that is mounted on body 104 near the U-shaped bracket 210. Thus, as depicted in view 1300' of FIG. 13B, a retaining pin 140 may be inserted through holes 214, 216 to lock the wheel assembly 150 into place during towing.

Figure 11:
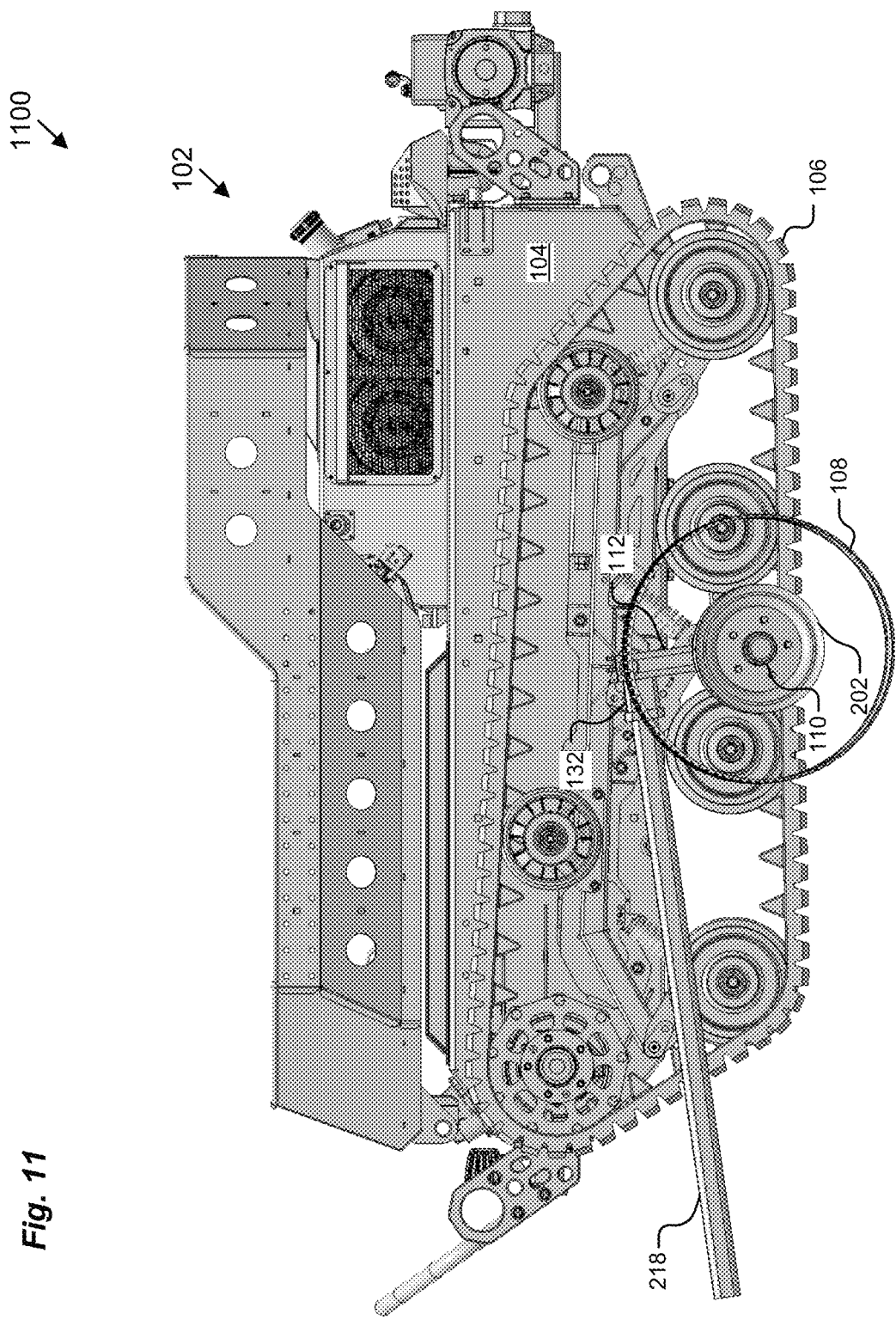
FIG. 11 depicts a view of an example tracked vehicle with a supplemental wheel that has been configured for use in towing by operation of a lever in connection with various embodiments.

In some embodiments (see, e.g., FIG. 11), when in the towing configuration, arm 112 has extended backwards slightly past a vertical configuration (compare FIG. 10 in which arm 112 is close to horizontal and facing forwards with FIG. 11 in which the arm 112 is almost vertical and facing slightly backwards). This configuration is beneficial because once the arm 112 is facing backwards, the weight of the vehicle 102 will tend to keep it in place, so that a single operator is able to let go of the lever bar 218 prior to inserting retaining pin 140 through holes 214, 216 to lock the wheel assembly 150 into place during towing.

FIG. 14 depicts a view 1400 of an example vehicle 102 with a lever bar 218 for both towing and jacking towing wheels 108 in a storage configuration. Thus, lever bar 218 is stored on the top 221 of the vehicle body 104, held in place by one or more straps 224. A retaining pin 222 may also affix the lever bar 218 at one end to the top 221 of the body 104.

Figure 15:
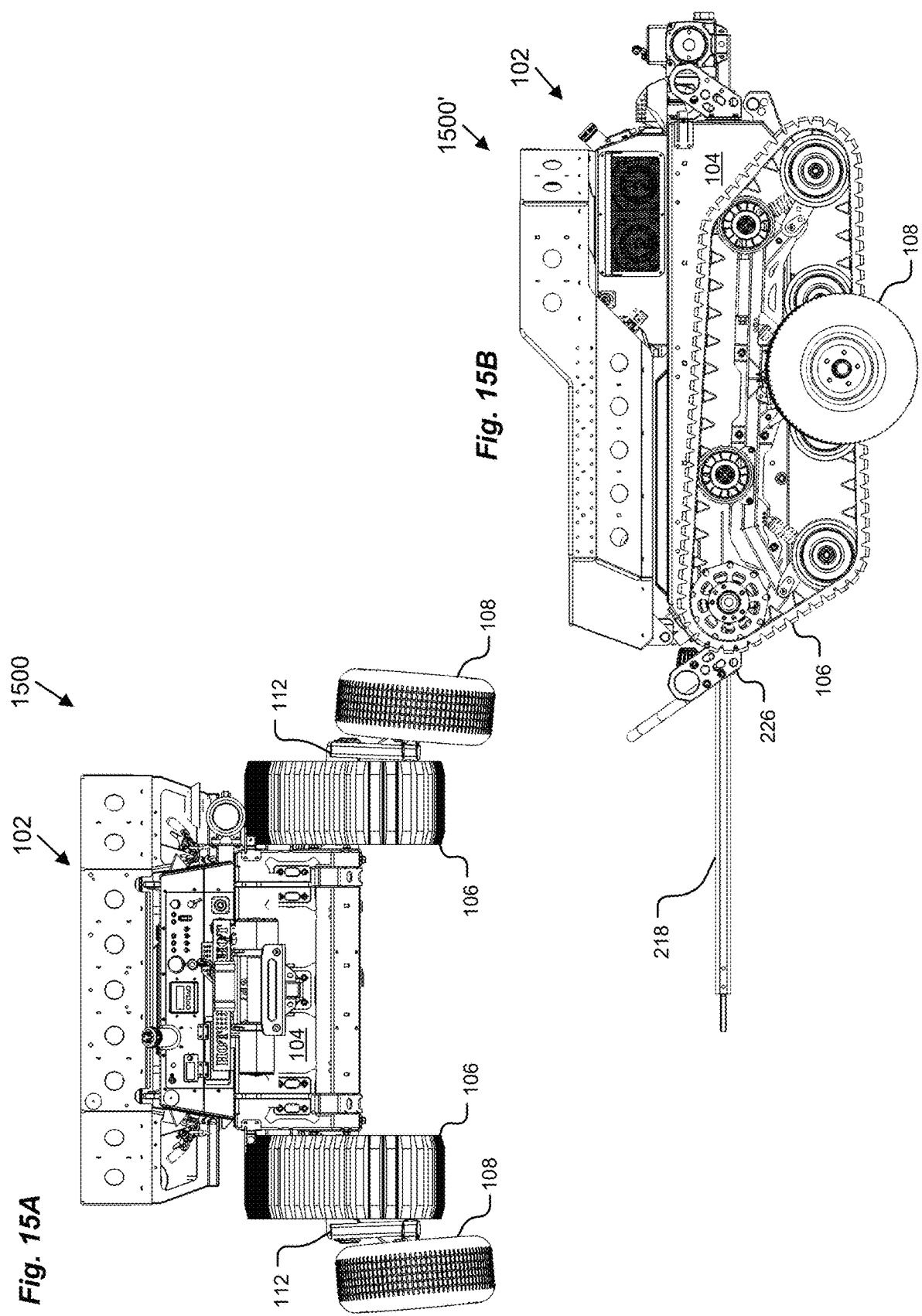
FIGS. 15A-15B depict views of an example tracked vehicle with supplemental wheels that have been configured for use in towing in connection with various embodiments.

FIGS. 15A-15B depict views 1500, 1500', respectively, of an example tracked vehicle 102 with wheels 108 that have been configured for use in towing in connection with various embodiments. View 1500 is from the rear of the vehicle 102. It can be seen that a wheel 108 is placed on each side (left and right) of the vehicle 102, and the vehicle 102 is jacked up on the wheels 108 so that the tracks 106 do not make contact with the ground. Thus, the weight of the vehicle is supported by the wheels 108 rather than by the track 106. Arms 112 can also be seen between each wheel 108 and its nearby track 106. As depicted in view 1500, the wheels 108 are not quite parallel to the tracks 106 (i.e., the wheels 108 are not quite perpendicular to the ground). This is because view 1500 has been generated without accounting for the weight of the vehicle 102 against the ground. Thus, as is well-known in the art, the engineering tolerances have been designed such that without a load, the wheels 108 are not quite parallel to the tracks 106 because once the load of the vehicle 102 is applied, the wheels 108 will be pushed out by the weight and then they will be parallel to the tracks 106.

View 1500' is a side view of the vehicle 102 again with the vehicle 102 jacked up onto wheels 108 rather than on the tracks 106. In this view 1500' it can be seen that the lever bar 218 has been removed from the leverage receiver 132 and attached to a towing hitch assembly 226 at the front of the vehicle body 104 (e.g., using retaining pin 222, not depicted in FIG. 15B). Lever bar 218 is thus used as a towing connector to attach the vehicle 102 to a towing vehicle (not depicted).

Figure 16:
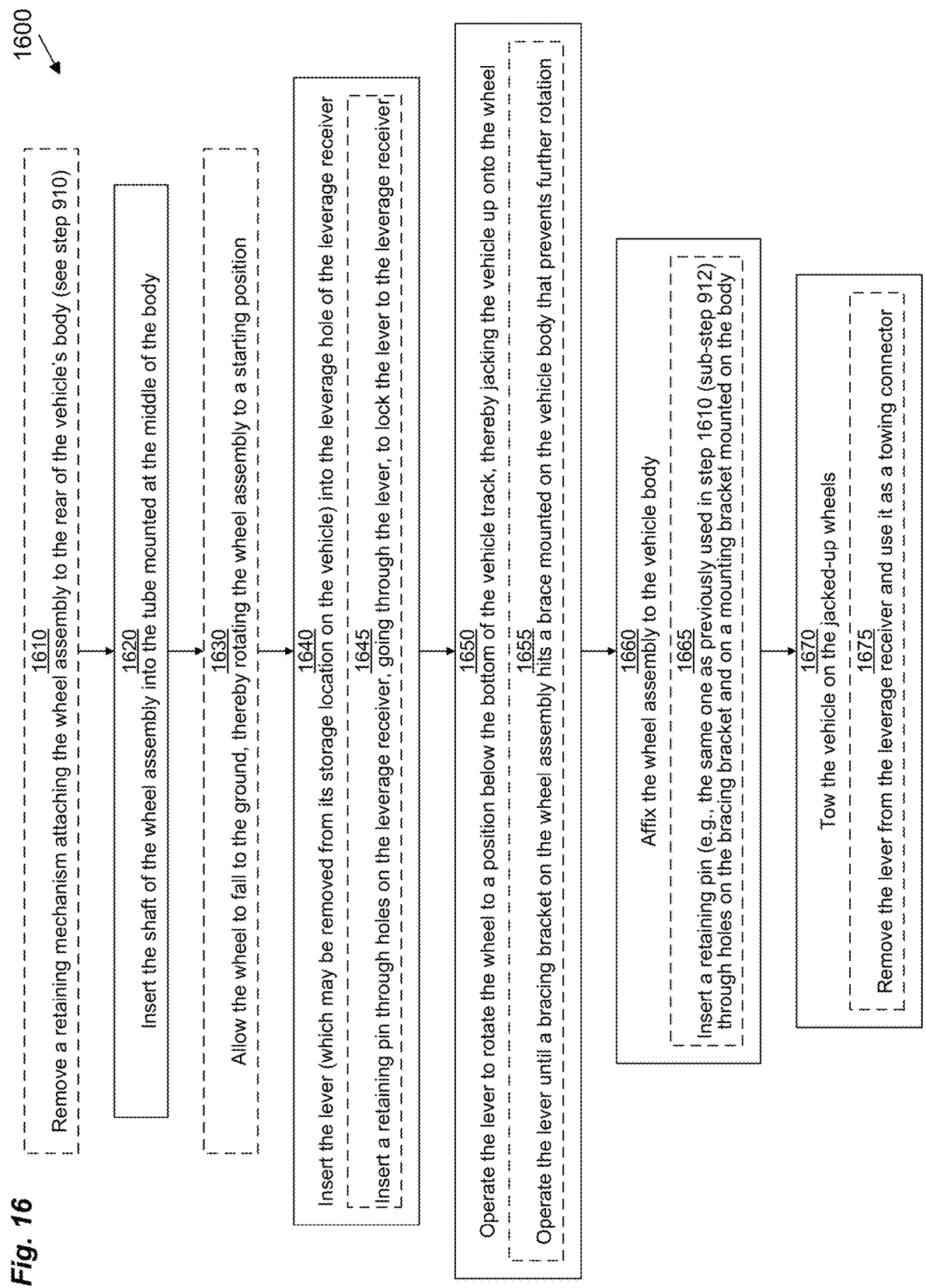
FIG. 16 is a flowchart depicting example methods of reconfiguring a vehicle to use a support wheel for a towing configuration.

FIG. 16 is a flowchart depicting an example method 1600 according to various embodiments of reconfiguring a vehicle 102 use a wheel 108 for towing. It should be understood that in embodiments in which multiple wheels 108 are used, method 1600 is typically performed with respect to two or more of the wheels 108, as desired. It should be understood that one or more of the steps or sub-steps of method 1600 may be omitted in some embodiments. Similarly, in some embodiments, one or more steps or sub-steps may be combined together or performed in a different order. Steps and sub-steps marked with dashed lines are either optional or represent alternative embodiments.

In some embodiments, method 1600 may begin with step 1610. In step 1610, an operator removes a retaining mechanism attaching the wheel assembly 150 to the rear of the vehicle body 104. Step 1610 is similar to step 910, described above in further detail. In addition, as part of step 1610, the operator slides the wheel assembly 150 completely away from the vehicle body 104 in direction 144 as depicted in FIG. 8. In other embodiments, step 1610 may be omitted, the wheel assembly 150 being stored at a different location (e.g., elsewhere on the vehicle 102 or entirely off the vehicle).

In step 1620, the operator inserts (e.g., opposite direction 144) the shaft 134 of the wheel assembly 150 into the tube 208 mounted at the middle of the body 104.

Then, in step 1630, the operator allows the wheel 108 to fall to the ground, thereby rotating the wheel assembly 150 into an initial position (see e.g., FIG. 10). In some embodiments step 1630 may be omitted either because the wheel assembly 150 was initially inserted exactly at the initial positon or because the leverage operation may begin with the wheel 108 off of the ground.

Then, in step 1640, the operator inserts the lever bar 218 (which may have been removed from its storage location on the top 221 of the body 104, see FIG. 14) into the leverage hole 206 of the leverage receiver 132. See FIG. 12B. In some embodiments, as part of step 1640, operator also performs sub-step 1645 in which one or more retaining pins 222 is inserted through holes 204 of the leverage receiver 132 as well as through a hole (not depicted) through the lever bar 218. Sub-step 1645 is a safety precaution to prevent the lever bar 218 from falling out of the leverage hole 206 during step 1650.

Then, in step 1650, the operator operates the lever bar 218 to rotate the wheel 108 along direction 220 (see FIG. 10) to a position below the bottom of the vehicle track 106, thereby jacking the vehicle 102 up onto the wheel 108 instead of the vehicle 102 resting on the track 106 as before. In some embodiments, step 1650 may be accomplished via sub-step 1655 in which the operator operates the lever bar 218 until a bracing bracket 118 on the wheel assembly 150 hits a bracket 210 mounted on the body 104 that prevents further forward rotation (see FIG. 13B).

Then, in step 1660, the operator affixes the wheel assembly 150 to the body 104. In some embodiments, step 1660 may be accomplished via sub-step 1665 in which the operator inserts a retaining pin (e.g., the same retaining pin 140 as previously used in step 1610 (see sub-step 912 from method 900)) through holes 214, 216 on the bracing bracket 118 and on mounting bracket 212, respectively (see FIGS. 13A, 13B).

Then, in step 1670, the operator may tow the vehicle 102 on the jacked-up wheels 108 (see FIGS. 15A, 15B). In some embodiments, step 1670 includes sub-step 1675 in which the operator first removes the lever bar 218 from the leverage receiver 132 and uses it as a towing connector by hitching the lever bar 218 to the towing hitch assembly 226 (see FIG. 15B).

Thus, example apparatuses and techniques have been presented for towing tracked vehicles (e.g., vehicles 102) at high speeds without the noted deficiencies of high speed usage. This may be accomplished by configuring these vehicles 102 to be used with towing wheels 108 that may easily be installed while jacking up the vehicle 102 off its track 106 using a wheel assembly 150. In some embodiments, a single operator may configure the vehicle 102 for towing using a lever system (e.g., using lever bar 218). In some embodiments, the towing wheels 108 may be stored elsewhere (e.g., at the rear, see FIG. 1) on the vehicle 102 for easy access. In some embodiments, the lever bar 218 may be stored on the vehicle 102 for easy access (e.g., at the top 221, see FIG. 14). In some embodiments, the lever bar 218 may also be used as a towing connector (see, e.g., FIG. 15B). Advantageously, the various embodiments provided allow the vehicle 102 to be easily configured for raised towing.

In addition, example apparatuses and techniques have been presented for allowing a vehicle (e.g., vehicles 102) to be configured to extend supplemental wheels 108 from a storage configuration (see, e.g., FIGS. 1, 3A, 3B) into a ground support configuration (see, e.g., FIGS. 2, 4A, 4B) in which the vehicle 102 is able to make use of the supplemental wheels 108 for additional ground support. This may be accomplished by using a wheel assembly 150 that is able to rotate a supplemental wheel 108 from a storage position into a usage position with locks in both (or multiple) positions (see, e.g., FIGS. 3A-4B and 6-7). In some embodiments, a single wheel assembly 150 may be used to allow a single storage configuration (see, e.g., FIGS. 1, 3A, 3B) to be reconfigured for both extended ground support (see, e.g., FIGS. 2, 4A, 4B) and towing (see, e.g., FIGS. 13A-13B and 15A-15B), depending on the situation.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, it should be understood that although a shaft 134 of wheel assembly 150 has been described as fitting into tubes 122, 208 mounted on body 104, these elements may be reversed without altering the basic principles of operation. Thus, in some embodiments, a tube of wheel assembly 150 slides (along direction 144 and its reverse) around a shaft mounted on body 104, taking the place of tube 122 or 208, either at the rear or the middle of the vehicle 102.

As another example, although various embodiments have been described as being methods, software embodying these methods is also included.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

TABLE 1

Table of reference characters.

| Reference Character | Description |
|---|---|
| 102 | Vehicle |
| 104 | Body of vehicle 102 |
| 106 | Track of vehicle 102 |
| 108 | Towing/Extension Wheel |
| 110 | Axle of wheel 108 |
| 112 | Arm of wheel assembly 150 |
| 114 | Mounting Bracket mounted on axle 110 |
| 115 | Retaining Pin Hole on bracket 114 |
| 116 | Mounting Bracket mounted on body 104 |
| 117 | Retaining Pin Hole on bracket 116 |
| 118 | Bracing Bracket |
| 120 | Peg that braces bracket 118 against body 104 |
| 122 | Tube mounted on body 104 for receiving shaft 134 |
| 124 | Hole on tube 122 for receiving a retaining pin when wheel assembly 150 is in a stored position and hole 136 within shaft 134 is exposed |
| 126 | Hole on tube 122 for receiving a retaining pin when wheel assembly 150 is in a lowered position (for use in extending the support of the vehicle 102) and hole 138 within shaft 134 is exposed |
| 128 | Depression in body 104 for receiving peg 120 when wheel assembly 150 is in a stored position |
| 130 | Depression in body 104 for receiving peg 120 when wheel assembly 150 is in a lowered position (for use in extending the support of the vehicle 102). |
| 132 | Leverage Receiver for receiving lever 218 |
| 134 | Shaft of wheel assembly 150 for insertion into vehicle-mounted tubes 122 and 208 |
| 136 | Hole within shaft 134 for receiving a retaining pin when wheel assembly 150 is in a stored position |
| 138 | Hole within shaft 134 for receiving a retaining pin when wheel assembly 150 is in a lowered position (for use in extending the support of the vehicle 102) |
| 140 | Retaining Pin for insertion into holes 115 and 117 (may also be inserted into holes 214 and 216 |
| 142 | Direction of removal of pin 140 from holes 115 and 117 |
| 144 | Direction of removal of wheel assembly 150 from body 104 |
| 150 | Wheel Assembly |
| 202 | Hub of wheel 108 |
| 204 | Holes in leverage receiver 132 for receiving retaining pin(s) 222 |
| 206 | Leverage Hole in leverage receiver 132 for receiving lever 218 |
| 208 | Tube mounted on body 104 for receiving shaft 134 when in a towing configuration |
| 210 | U-shaped Bracket for bracing against bracing bracket 118 |
| 212 | Mounting Bracket mounted on body 104 for use in a towing configuration |
| 214 | Retaining Pin Hole on bracket 212 |
| 216 | Retaining Pin Hole on bracket 118 |
| 218 | Lever for leveraging wheel assembly 150 into a towing configuration |
| 220 | Direction of rotation of lever 218 for rotating wheel assembly 150 into a towing configuration |
| 221 | Top Surface of body 104 |
| 222 | Retaining Pin for affixing lever 218 to leverage receiver 132 |
| 224 | Rubber Straps for attaching lever 218 to top surface 221 |
| 226 | Towing hitch assembly |

We claim:

1. A method of towing a tracked vehicle having a track, the method comprising:

swinging a wheel assembly coupled to the tracked vehicle about a first axis substantially parallel to but offset from a second axis of rotation of a wheel of the wheel assembly until the wheel reaches a towing position in which a bottom portion of the track extends below a lowest extent of the track such that at least part of the weight of the vehicle is borne by the wheel, said swinging including inserting a lever into a lever receiver mounted on the wheel assembly adjacent to the first axis and pushing the lever to rotate the wheel assembly about the first axis;

locking the wheel assembly into the towing position to prevent further swinging; and towing the tracked vehicle supported on the wheel rather than the track.

2. The method of claim 1 wherein the method further comprises, prior to swinging the wheel assembly, coupling a shaft of the wheel assembly to a mounting point on the tracked vehicle by pushing the shaft along the first axis while the wheel is entirely above the lowest extent of the track.

3. The method of claim 2 wherein the method further comprises, prior to coupling the shaft of the wheel assembly to the mounting point on the tracked vehicle by pushing the shaft along the first axis, removing the shaft of the wheel assembly from an alternate mounting point elsewhere on the tracked vehicle, the shaft having previously been coupled to the alternate mounting point such that the wheel assembly was coupled to a body of the tracked vehicle without interfering with driving operation of the tracked vehicle.

4. The method of claim 1 wherein towing the tracked vehicle includes:

removing the lever from the lever receiver;
connecting the tracked vehicle to a towing vehicle using the lever as a towing connector; and
operating the towing vehicle to pull the tracked vehicle while rolling on the wheel.

5. A method of towing a tracked vehicle having a first track and a second track, the method comprising:

swinging a first wheel assembly coupled to the tracked vehicle about a first axis substantially parallel to but offset from a second axis of rotation of a first wheel of the first wheel assembly until the first wheel reaches a towing position in which a bottom portion of the first wheel extends below a lowest extent of the first track such that at least part of the weight of the vehicle is borne by the first wheel;

locking the first wheel assembly into the towing position to prevent further swinging;

swinging a second wheel assembly coupled to the tracked vehicle about a third axis substantially parallel to but offset from a fourth axis of rotation of a second wheel of the second wheel assembly until the second wheel reaches a towing position in which a bottom portion of the second wheel extends below a lowest extent of the second track such that at least part of the weight of the vehicle is borne by the second wheel;

locking the second wheel assembly into the towing position to prevent further swinging; and towing the tracked vehicle supported on the first wheel and the second wheel rather than on the first track and the second track, wherein the method further comprises, prior to swinging the second wheel assembly, coupling a shaft of the second wheel assembly to a mounting point on the tracked vehicle by pushing the shaft along the third axis while the second wheel is entirely above the lowest extent of the second track.

6. The method of claim 5 wherein the method further comprises, prior to coupling the shaft of the second wheel assembly to the mounting point on the tracked vehicle by pushing the shaft along the third axis, removing the shaft of the second wheel assembly from an alternate mounting point elsewhere on the tracked vehicle, the shaft having been previously coupled to the alternate mounting point such that the second wheel assembly was coupled to a body of the tracked vehicle without interfering with driving operation of the tracked vehicle.

7. The method of claim 5 wherein swinging includes:
inserting a lever into a lever receiver mounted on the second wheel assembly adjacent to the third axis; and
pushing the lever to rotate the second wheel assembly about the third axis.

8. The method of claim 7 wherein towing the tracked vehicle includes:
removing the lever from the lever receiver;
connecting the tracked vehicle to a towing vehicle using the lever as a towing connector; and
operating the towing vehicle to pull the tracked vehicle while rolling on the first wheel and the second wheel.

9. A method of configuring a tracked vehicle for towing, the method comprising:
swinging a wheel assembly coupled to the tracked vehicle about a first axis substantially parallel to but offset from a second axis of rotation of a wheel of the wheel assembly until the wheel reaches a towing position in which a bottom portion of the wheel extends below a lowest extent of a track of the tracked vehicle such that at least part of the weight of the vehicle is borne by the wheel; and
locking the wheel assembly into the towing position to prevent further swinging;

wherein the method further comprises, prior to swinging the wheel assembly, coupling a shaft of the wheel assembly to a mounting point on the tracked vehicle by pushing the shaft along the first axis while the wheel is entirely above the lowest extent of the track.

10. The method of claim 9 wherein the method further comprises, prior to coupling the shaft of the wheel assembly to the mounting point on the tracked vehicle by pushing the shaft along the first axis, removing the shaft of the wheel assembly from an alternate mounting point elsewhere on the tracked vehicle, the shaft having previously been coupled to the alternate mounting point such that the wheel assembly was coupled to a body of the tracked vehicle without interfering with driving operation of the tracked vehicle.

11. The method of claim 9 wherein swinging includes:
inserting a lever into a lever receiver mounted on the wheel assembly adjacent to the first axis; and
pushing the lever to rotate the wheel assembly about the first axis.

12. The method of claim 11 wherein towing the tracked vehicle includes:
removing the lever from the lever receiver;
connecting the tracked vehicle to a towing vehicle using the lever as a towing connector; and
operating the towing vehicle to pull the tracked vehicle while rolling on the wheel.

* * * * *